US008928288B2

(12) United States Patent
Abe et al.

(10) Patent No.: US 8,928,288 B2
(45) Date of Patent: Jan. 6, 2015

(54) CONTROLLER, CONTROLLER NETWORK AND CONTROL METHOD

(75) Inventors: Hiroyuki Abe, Anjo (JP); Tetsuya Hatta, Kuwana (JP)

(73) Assignee: NGK Insulators, Ltd., Nagoya (JP)

( * ) Notice: Subject to any disclaimer, the term of this patent is extended or adjusted under 35 U.S.C. 154(b) by 471 days.

(21) Appl. No.: 13/419,794

(22) Filed: Mar. 14, 2012

(65) Prior Publication Data

US 2012/0169291 A1 Jul. 5, 2012

Related U.S. Application Data

(63) Continuation of application No. PCT/JP2010/066010, filed on Sep. 16, 2010.

(30) Foreign Application Priority Data

Oct. 5, 2009 (JP) .................................. 2009-231260

(51) Int. Cl.
*H02J 7/00* (2006.01)
*H01M 10/44* (2006.01)

(52) U.S. Cl.
CPC ............ *H02J 7/0018* (2013.01); *H01M 10/44* (2013.01); *H02J 7/0013* (2013.01); *H02J 2007/0067* (2013.01); *H02J 7/0026* (2013.01)
USPC ...................................................... 320/134

(58) Field of Classification Search
USPC ........................................................ 320/134
See application file for complete search history.

(56) References Cited

U.S. PATENT DOCUMENTS

| 6,975,095 | B2 * | 12/2005 | Ooi et al. ....................... 320/132 |
| 7,573,233 | B1 * | 8/2009 | Chow et al. .................... 320/116 |
| 8,143,859 | B2 * | 3/2012 | Iida ................................. 320/134 |
| 8,203,311 | B2 * | 6/2012 | Takahashi et al. .............. 320/134 |
| 8,598,848 | B2 * | 12/2013 | Zheng et al. ................... 320/132 |
| 2004/0257087 | A1 | 12/2004 | Murakami |
| 2008/0076010 | A1 | 3/2008 | Sato |
| 2008/0224541 | A1 | 9/2008 | Fukuhara |

FOREIGN PATENT DOCUMENTS

| CN | 1042907 C | 4/1999 |
| CN | 1565067 A | 1/2005 |
| CN | 101375482 A | 2/2009 |
| JP | 08-033240 A1 | 2/1996 |
| JP | 2000-116014 A1 | 4/2000 |
| JP | 2003-244854 A1 | 8/2003 |

(Continued)

OTHER PUBLICATIONS

International Search Report dated Dec. 21, 2010.

(Continued)

*Primary Examiner* — M'Baye Diao
(74) *Attorney, Agent, or Firm* — Burr & Brown, PLLC

(57) ABSTRACT

A controller, a controller network and a method for controlling a charging/discharging that easily make SOC of secondary batteries close to a target value are provided. An ordering index including difference $\Delta SOCm = SOCt - SOCm$ between the target value $SOCt$ of SOC (state of charge) and a calculated value $SOCm$ of SOC as a main factor is reflected to an order of charging priority and an order of discharging priority of NaS battery. In addition, charging power is allocated to secondary batteries in descending manner of order of discharging priority and discharging power is allocated to the secondary batteries in descending manner order of discharging priority.

29 Claims, 13 Drawing Sheets

(56) References Cited

FOREIGN PATENT DOCUMENTS

| | | |
|---|---|---|
| JP | 3599387 B2 | 12/2004 |
| JP | 2008-084677 A1 | 4/2008 |
| JP | 2009-011138 A1 | 1/2009 |

OTHER PUBLICATIONS

Chinese Office Action (and a partial English translation provided by foreign counsel) from a corresponding Chinese patent application bearing a mailing date of Jan. 13, 2014, 21 pages.

* cited by examiner

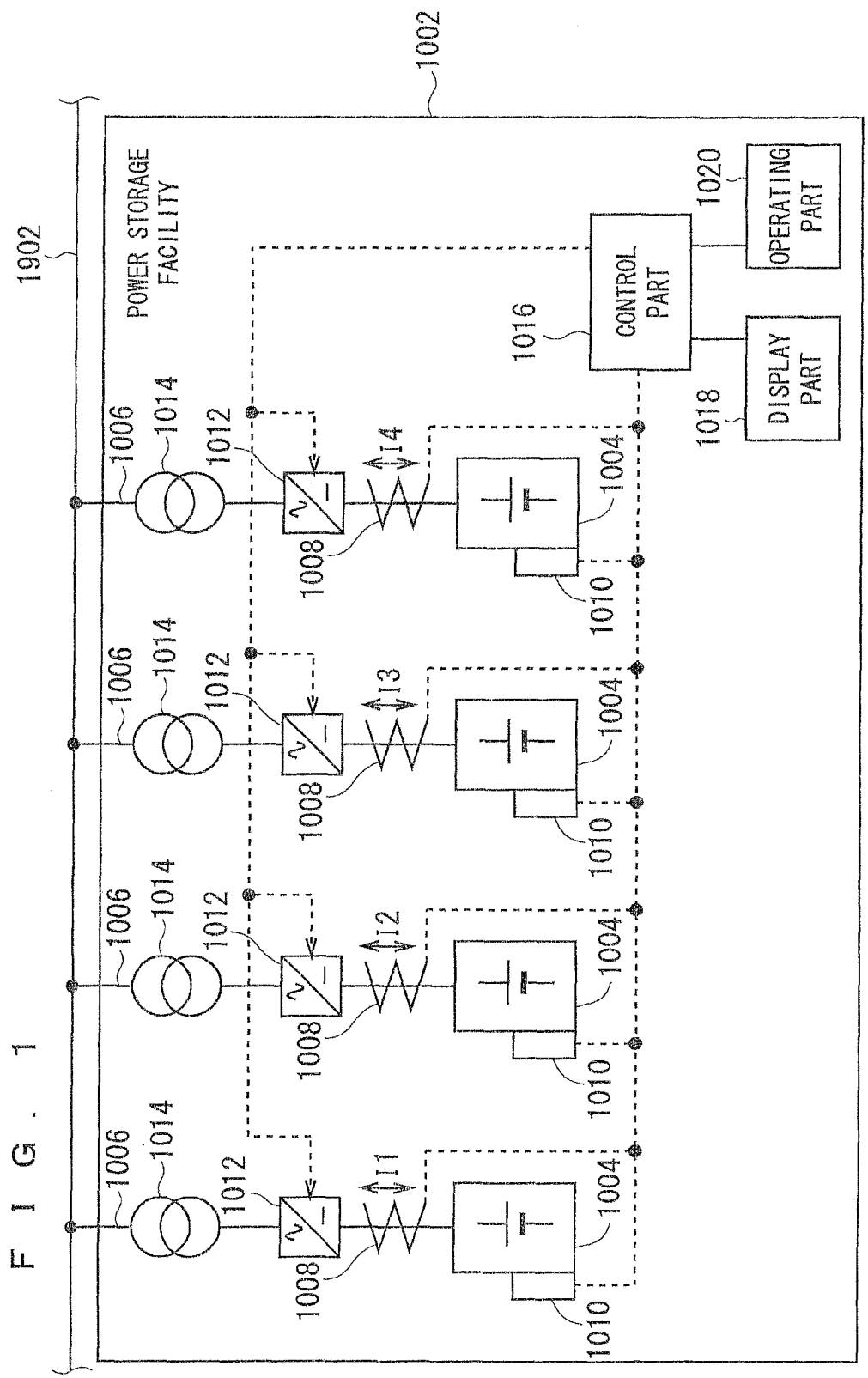

F I G. 4
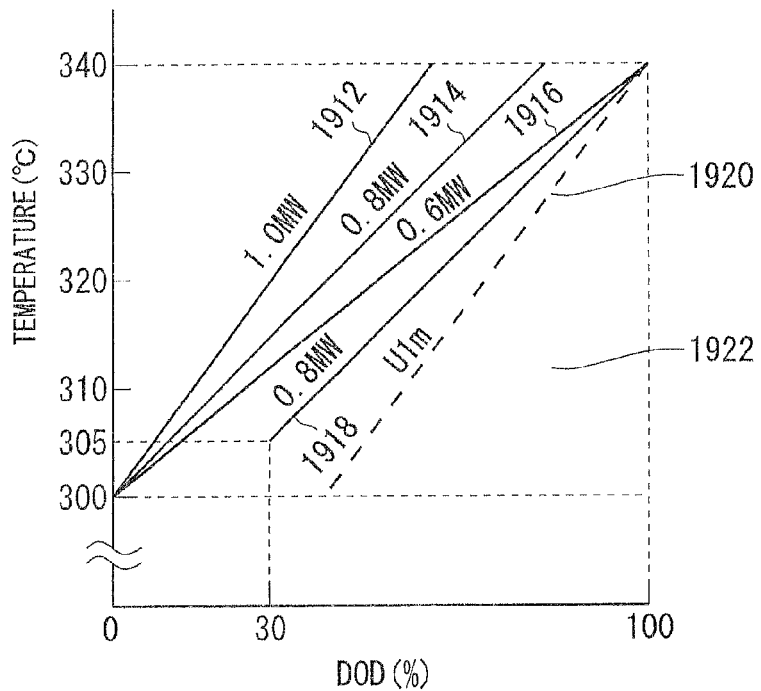
F I G. 5
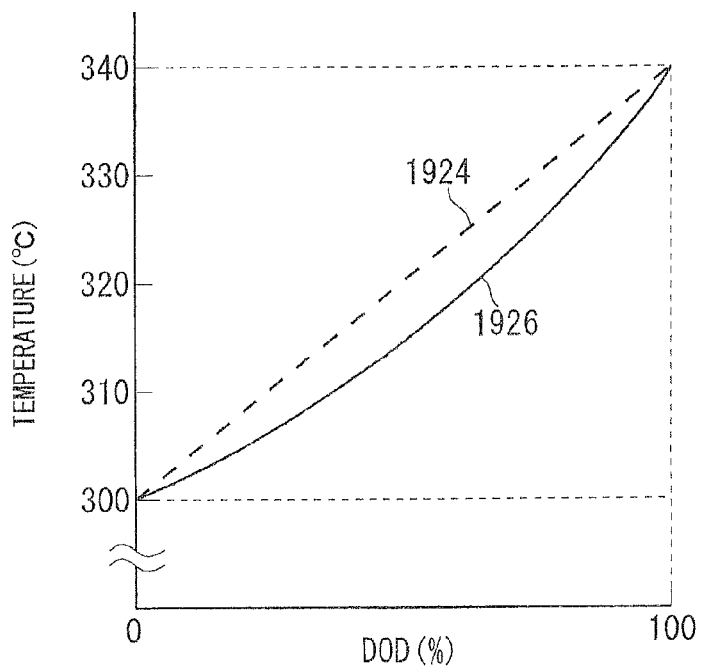

F I G. 6
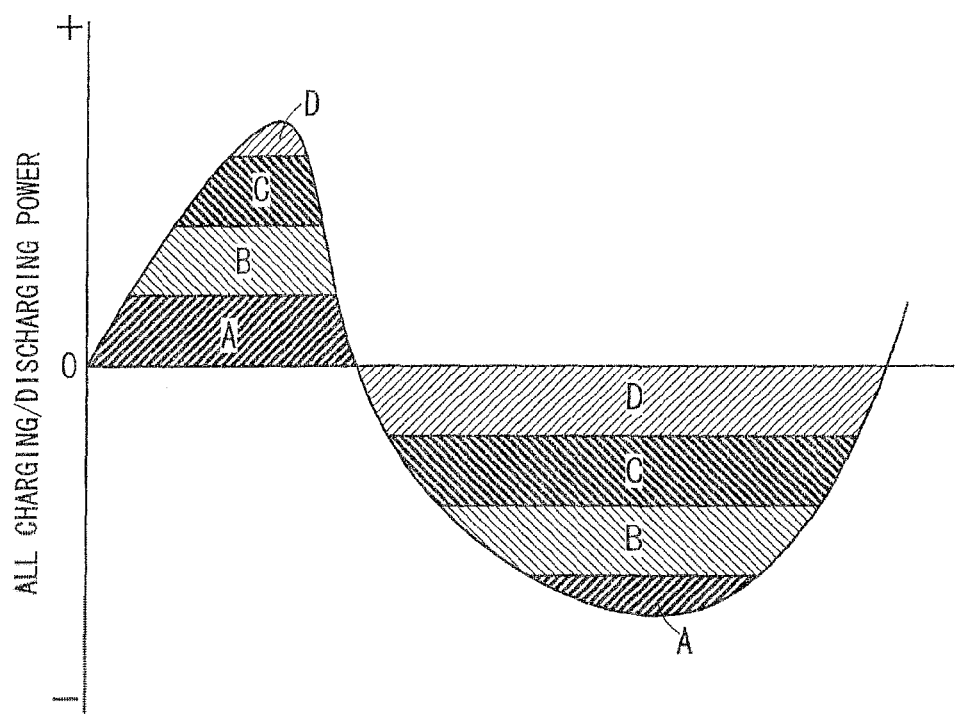
F I G. 7
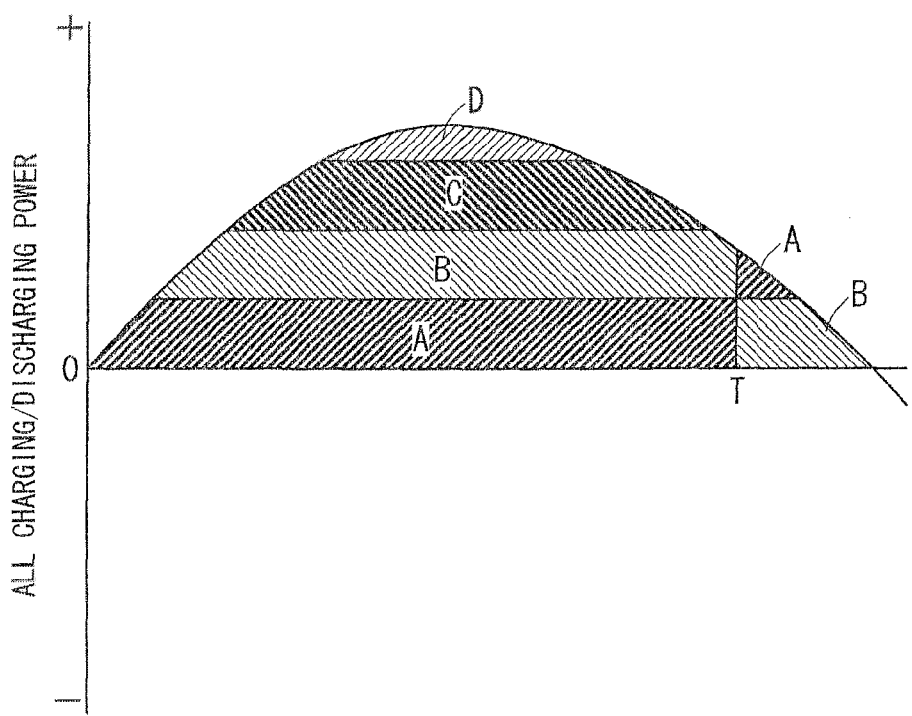

F I G . 8
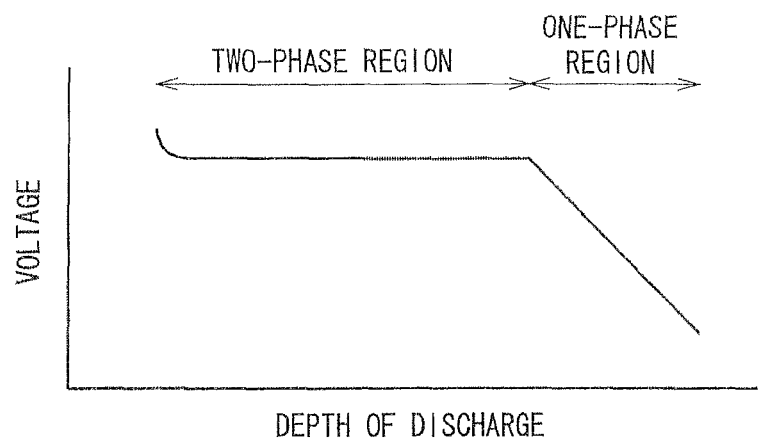
F I G . 9
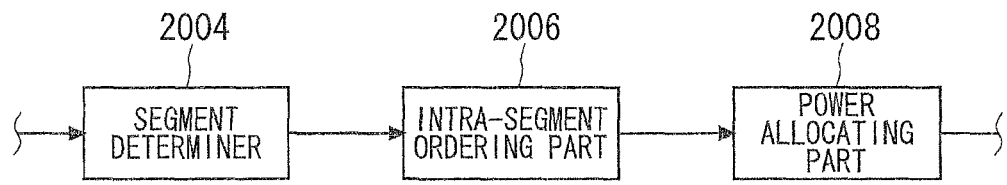

|  | T1 | T2 | T3 | T4 |
|---|---|---|---|---|
| NaS BATTERY 1 | 1 | n | n-1 | n-2 |
| NaS BATTERY 2 | 2 | 1 | n | n-1 |
| ⋮ | ⋮ | ⋮ | ⋮ | ⋮ |
| NaS BATTERY n | n | n-1 | n-2 | n-3 |

INTRA-SEGMENT ORDER OF CHARGING PRIORITY

|  | ORDER OF CHARGING PRIORITY | ORDER OF DISCHARGING PRIORITY |
|---|---|---|
| SPECIFIC NaS BATTERY | 1, 2, ⋯, m | 1, 2, ⋯, m |
| UNSPECIFIC NaS BATTERY | m+1, m+2, ⋯, m+n | m+1, m+2, ⋯, m+n |

F I G . 1 3

|  | CHARGING PRIORITY DEGREE SEGMENT | DISCHARGING PRIORITY DEGREE SEGMENT |
|---|---|---|
| SPECIFIC NaS BATTERY | 1 | 1 |
| UNSPECIFIC NaS BATTERY | REFLECT SEGMENT DETERMINING INDEX | REFLECT SEGMENT DETERMINING INDEX |

F I G . 1 4

|  | INTRA-SEGMENT ORDER OF CHARGING PRIORITY | INTRA-SEGMENT ORDER OF DISCHARGING PRIORITY |
|---|---|---|
| SPECIFIC NaS BATTERY | 1, 2, ···, m | 1, 2, ···, m |
| UNSPECIFIC NaS BATTERY | m+1, m+2, ···, m+n | m+1, m+2, ···, m+n |

F I G . 1 7
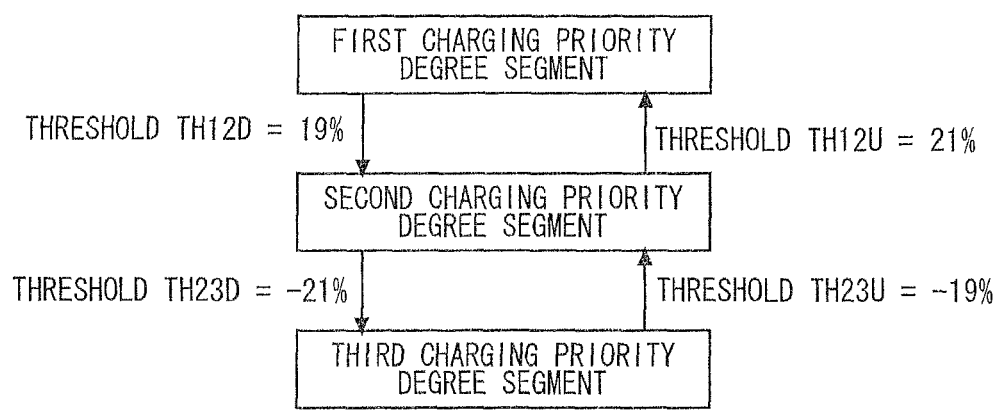

F I G . 1 8
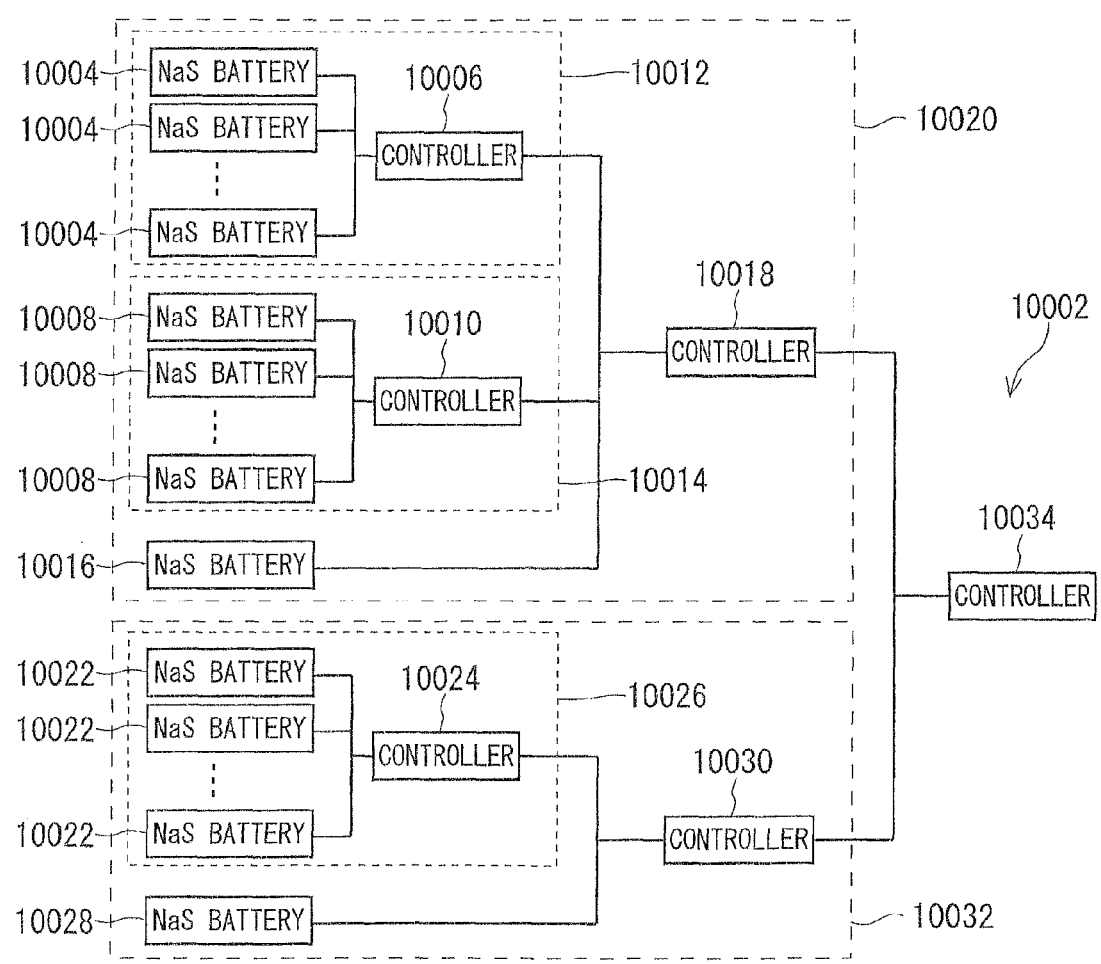

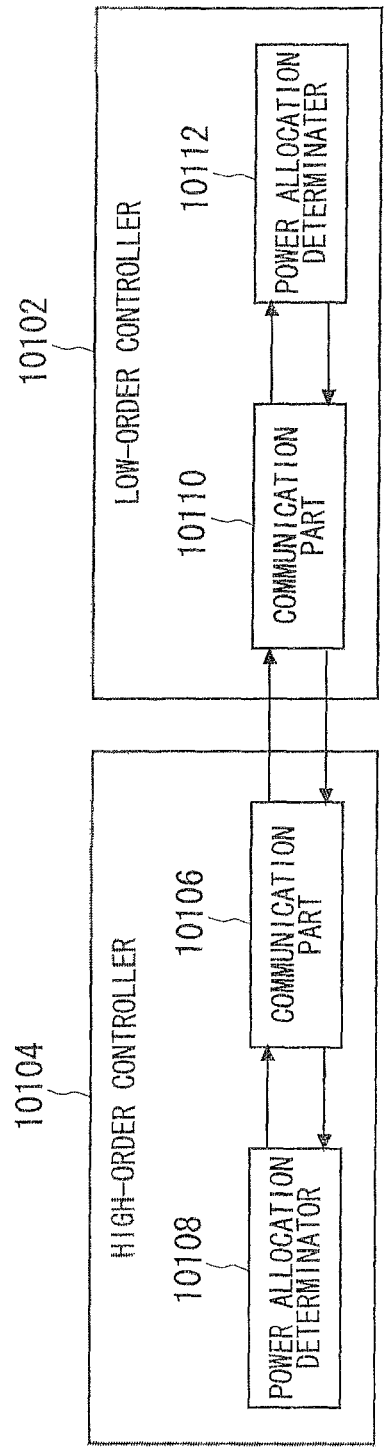
F I G. 1 9

US 8,928,288 B2

CONTROLLER, CONTROLLER NETWORK AND CONTROL METHOD

TECHNICAL FIELD

The present invention relates to a controller for controlling charging/discharging of a plurality of secondary batteries, a controller network having a plurality of controllers for controlling charging/discharging in a plurality of charging/discharging units, and a control method for controlling charging/discharging of a plurality of secondary batteries.

BACKGROUND ART

Patent Document 1 relates to control of charging/discharging of a plurality of secondary batteries. Patent Document 1 discloses that orders of charging priority and orders of discharging priority are given to the plurality of secondary batteries (secondary battery modules 7a and 7b) (paragraph 0090, etc.), charging power is allocated to the secondary batteries in descending manner of order of charging priority and discharging power is allocated to the secondary batteries in descending manner of order of discharging priority (paragraph 0107), the charging/discharging power is adjusted according to an amount, correlated with internal resistance (paragraph 0080, etc.) and so on.

PRIOR ART DOCUMENT

Patent Document

Patent Document 1: Japanese Patent No. 3599387

SUMMARY OF THE INVENTION

Problem to be Solved by the Invention

However, in control of charging/discharging of the plurality of secondary batteries in Patent Document 1, the orders of charging priority and the orders of discharging priority to be given to the plurality of secondary batteries are fixed (paragraph 0090, etc.).

On the other hand, in a power storage facility having a plurality of secondary batteries, SOC (state of charge) of the plurality of secondary batteries are occasionally desired to be close to a target value. For example, when the power storage facility performs power smoothing operation, a target value of SOC is mostly set to about 50%. Further, when calculated values of discharged capacities in the secondary batteries are corrected at a charging end, the target value of SOC is temporarily set to about 100%, and when the calculated values of the discharged capacities in the secondary batteries are corrected at a discharge end, the target value is temporarily set to about 0%.

However, in control of the charging/discharging of the plurality of conventional secondary batteries in Patent Document 1 and so on, it is occasionally difficult to make the SOC of the secondary batteries close to the target value.

The present invention has been devised in order to solve this problem, and its object is to provide a controller, a controller network and a control method that easily make SOC of secondary batteries close to a target value.

Means for Solving the Problem

Means for solving the above problem will be described below.

A first invention is a controller for controlling charging/discharging of a plurality of secondary batteries, including a charging/discharging current measuring part for measuring a charging/discharging current of each of the plurality of secondary batteries, a bidirectional converter for controlling charging/discharging of each of the plurality of secondary batteries so that charging/discharging power takes a command, a discharging capacity calculator for integrating a measured value of the charging/discharging current measured by the charging/discharging current measuring part and calculating a discharging capacity of each of the plurality of secondary batteries, a charging state calculator for calculating a state of charge of each of the plurality of secondary batteries based on the calculated value of the discharging capacity calculated by the discharging capacity calculator, a priority degree determiner for reflecting a first index so as to determine a charging priority degree and a discharging priority degree of each of the plurality of secondary batteries, a power allocating part for allocating charging power to the secondary batteries in descending manner of the charging priority degree determined by the priority degree determiner and allocating discharging power to the secondary batteries in descending manner of the discharging priority degree determined by the priority degree determiner, and a charging/discharging command part for commanding the bidirectional converter to charge/discharge the charging/discharging power allocated by the power allocating part, wherein the first index includes a difference of a target value of the state of charge from the calculated value of the state of charge calculated by the charging state calculator as a factor, and the priority degree determiner raises the charging priority degree and lowers the discharging priority degree with the increasing difference of the target value of the state of charge from the calculated value of the state of charge calculated by the charging state calculator.

A second invention is the controller of the first invention further including a temperature sensor for measuring a temperature of each of the plurality of secondary batteries, wherein the plurality of secondary batteries are secondary batteries that cause an exothermic reaction when being discharged, the first index includes a measured value of the temperature measured by the temperature sensor as a factor, and the priority degree determiner lowers the discharging priority degree with the increasing measured value of the temperature measured by the temperature sensor.

A third invention is the controller of the first invention further including a temperature sensor for measuring temperature of each of the plurality of secondary batteries, wherein the plurality of secondary batteries are secondary batteries that cause an exothermic reaction when being charged, the first index includes a measured value of the temperature measured by the temperature sensor as a factor, and the priority degree determiner lowers the charging priority degree with the increasing measured value of the temperature measured by the temperature sensor.

A fourth invention is the controller of the first invention wherein the power allocating part allocates discharging power that is a first upper limit or less to each of the plurality of secondary batteries, the controller further includes a temperature sensor for measuring a temperature in each of the plurality of secondary batteries, and an upper limit calculator for calculating a second upper limit of the discharging power for maintaining the temperature at an upper limit temperature or less based on the measured value of the temperature measured by the temperature sensor and the calculated value of the discharging capacity calculated by the discharging capacity calculator in each of the plurality of secondary batteries, the first index includes a ratio of the second upper limit calculated by the upper limit calculator to the first upper limit as a factor, and the priority degree determiner raises the discharging priority degree with the increasing ratio of the second upper limit calculated by the upper limit calculator to the first upper limit.

A fifth invention is the controller of any one of the first to fourth inventions further including a necessity determiner for determining necessity of correction of the calculated value of the discharging capacity at a charging end in each of the plurality of secondary batteries, wherein the first index includes a determined result of the necessity determiner as a factor, and when the necessity determiner determines that the calculated value of the discharging capacity need to be corrected at the charging end, the priority degree determiner raises the charging priority degree and lowers the discharging priority degree.

A sixth invention is the controller of any one of the first to fourth inventions further including a necessity determiner for determining necessity of correction of the calculated value of the discharging capacity at a discharging end in each of the plurality of secondary batteries, wherein the first index includes a determined result of the necessity determiner as a factor, and when the necessity determiner determines that the calculated value of the discharging capacity needs to be corrected at the discharging end, the priority degree determiner lowers the charging priority degree and raises the discharging priority degree.

A seventh invention is the controller of any one of the first to sixth inventions further including a charging end detector for detecting arrival at the charging end at which the calculated value of the discharging capacity is corrected in each of the plurality of secondary batteries, wherein the first index includes a detected result of the charging end detector as a factor, and when the charging end detector detects the arrival at the charging end, the priority degree determiner lowers the charging priority degree and raises the discharging priority degree.

An eighth invention is the controller of any one of the first to sixth inventions further including a discharging end detector for detecting arrival at the discharging end at which the calculated value of the discharging capacity is corrected in each of the plurality of secondary batteries, wherein the first index further includes a detected result of the discharging end detector as a factor, and when the discharging end detector detects the arrival at the discharging end, the priority degree determiner raises the charging priority degree and lowers the discharging priority degree.

A ninth invention is the controller of any one of the first to eighth inventions further including a usage reflecting amount calculator for calculating a reflecting amount of usage of each of the plurality of secondary batteries, wherein the first index includes the reflecting amount of the usage calculated by the usage reflecting amount calculator as a factor, and the priority degree determiner raises the charging priority degree and the discharging priority degree with the decreasing usage.

A tenth invention is the controller of the first invention wherein the priority degree determiner includes a ordering part for reflecting the first index so as to giving order of charging priority and order of discharging priority to each of the plurality of secondary batteries, and the power allocating part allocates charging power to the secondary batteries in descending manner of the order of charging priority given by the ordering part and allocates discharging power to the secondary batteries in descending manner of the order of discharging priority given by the ordering part.

An eleventh invention is the controller of the first invention, wherein the priority degree determiner includes a segment determiner for carrying out stratification on the plurality of secondary batteries and determining a charging priority degree segment and a discharging priority degree segment to which each of the plurality of secondary batteries belongs based on the first index, the controller further includes an intra-segment ordering part for reflecting a second index different from the first index so as to give intra-segment order of charging priority to each of the secondary batteries in each charging priority degree segment and give intra-segment order of discharging priority to each of the secondary batteries in each discharging priority degree segment, the power allocating part allocates charging power to the secondary batteries in descending manner of the belonging charging priority degree segment determined by the segment determiner, allocates discharging power to the secondary batteries in descending manner of the belonging discharging priority degree segment determined by the segment determiner, allocates charging power to the secondary batteries belonging to the same charging priority degree segment in descending manner of the intra-segment order of charging priority determined by the intra-segment ordering part, and allocates discharging power to the secondary batteries in the same belonging discharging priority degree segment in descending manner of the intra-segment order of discharging priority determined by the intra-segment ordering part.

A twelfth invention is the controller of the eleventh invention further including a temperature sensor for measuring a temperature of each of the plurality of secondary batteries, wherein the plurality of secondary batteries are secondary batteries that cause an endothermic reaction when being charged and causes an exothermic reaction when being discharged, the second index includes a measured value of the temperature measured by the temperature sensor as a factor, and the intra-segment ordering part lowers the intra-segment order of discharging priority with the increasing measured value of the temperature measured by the temperature sensor.

A thirteenth invention is the controller of the eleventh invention, further including a temperature sensor for measuring a temperature of each of the plurality of secondary batteries, wherein the plurality of secondary batteries are secondary batteries that cause an exothermic reaction when being charged and cause an endothermic reaction when being discharged, the second index includes a measured value of the temperature measured by the temperature sensor as a factor, and the intra-segment ordering part lowers the intra-segment order of charging priority with the increasing measured value of the temperature measured by the temperature sensor.

A fourteenth invention is the controller of any one of the eleventh to thirteenth inventions, further including a necessity determiner for determining necessity of correction of a calculated value of discharging capacity at the charging end in each of the plurality of secondary batteries, wherein the second index includes a determined result of the necessity determiner as a factor, and when the necessity determiner determines that the calculated value of the discharging capacity to be corrected at the charging end needs, the intra-segment ordering part raises the intra-segment order of charging priority and lowers the intra-segment order of discharging priority.

A fifteenth invention is the controller of any one of the eleventh to thirteenth inventions, further including a necessity determiner for determining necessity of correction of the calculated value of the discharging capacity at the discharging end in each of the plurality of secondary batteries, wherein the second index includes a determined result of the necessity determiner as a factor, and when the necessity determiner determines that the calculated value of the discharging capacity needs to be corrected at the discharging end, the intra-segment ordering part lowers the intra-segment order of charging priority and raises the intra-segment order of discharging priority.

A sixteenth invention is the controller of any one of the eleventh to fifteenth inventions, further including a charging end detector for detecting arrival at the charging end at which the calculated value of the discharging capacity is corrected in each of the plurality of secondary batteries, wherein the second index includes a detected result of the charging end detector as a factor, and when the charging end detector detects the arrival at the charging end, the intra-segment ordering part lowers the intra-segment order of charging priority and raises the intra segment order of discharging priority.

A seventeenth invention is the controller of any one of the eleventh to fifteenth inventions further including a discharging end detector for detecting arrival at the discharging end at which the calculated value of the discharging capacity is corrected in each of the plurality of secondary batteries, wherein the second index includes a detected result of the charging end detector as a factor, and when the discharging end detector detects the arrival at the discharging end, the intra-segment ordering part raises the intra-segment order of charging priority and lowers the intra-segment order of discharging priority.

An eighteenth invention is the controller of any one of the eleventh to seventeenth inventions further including a usage reflecting amount calculator for calculating a reflecting amount of usage of each of the plurality of secondary batteries, wherein the second index includes the reflecting amount of the usage calculated by the usage reflecting amount calculator as a factor, and the intra-segment ordering part raises the intra-segment order of charging priority and the intra-segment order of discharging priority with the decreasing usage.

A nineteenth invention is the controller of any one of the eleventh to eighteenth inventions wherein the intra-segment ordering part gives highest intra-segment order of charging priority and highest intra-segment order of discharging priority to a specific secondary battery in the plurality of secondary batteries.

A twentieth invention is the controller of the first invention wherein the priority degree determiner has a segment determiner for carrying out stratification on the plurality of secondary batteries and determining charging priority degree segment and discharging priority degree segment to which each of the plurality of secondary batteries belongs based on the first index, the controller further includes an intra-segment ordering part for giving order of charging priority to each secondary battery in each charging priority degree segment and cyclically reshuffling the order of charging priority after time passes and giving order of discharging priority to each secondary battery in each discharging priority degree segment and cyclically reshuffling the order of discharging priority after time passes, and the power allocating part allocates charging power to the secondary batteries in descending manner of the belonging charging priority degree segment determined by the segment determiner, allocates discharging power to the secondary batteries in descending manner of the belonging discharging priority degree segment determined by the segment determiner, allocates the charging power to the secondary batteries belonging to the same charging priority degree segment in descending manner of the intra-segment order of charging priority given by the intra-segment ordering part, and allocates the discharging power to the secondary batteries belonging to the same discharging priority degree segment in descending manner of the intra-segment order of discharging priority given by the intra-segment ordering part.

A twenty-first invention is the controller of any one of the eleventh to twentieth inventions, wherein a threshold of the first index in case the segment determiner lowers the charging priority degree segment is shifted to a direction of lower charging priority degree than a threshold of the first index in case the segment determiner raises the charging priority degree segment.

A twenty-second invention is the controller of any one of the first to twenty-first inventions, wherein when a change in an allocating destination of the charging power from a first secondary battery into a second secondary battery is necessary due to a change in the charging priority degree determined by the priority degree determiner, the power allocating part reflects the change in the charging priority degree to the allocation of the charging power after the allocation of the charging power to the first secondary battery does not remain due to a decrease in all the charging power, and when a change in an allocating destination of the discharging power from the first secondary battery into the second secondary battery is necessary due to a change in the discharging priority degree determined by the priority degree determiner, the power allocating part reflects the change in the discharging priority degree to the allocation of the discharging power after allocation of the discharging power to the first secondary battery does not remain due to a decrease in all the discharging power.

A twenty-third invention is the controller of any one of the first to the twenty-second inventions wherein when the change in the allocating destination of the charging power from the first secondary battery into the second secondary battery is necessary due to the change in the charging priority degree determined by the priority degree determiner, the power allocating part gradually changes the allocating destination of the charging power from the first secondary battery into the second secondary battery, and when the change in the allocating destination of the discharging power from the first secondary battery into the second secondary battery is necessary due to the change in the discharging priority degree determined by the priority degree determiner, the power allocating part gradually changes the allocating destination of the discharging power from the first secondary battery into the second secondary battery.

A twenty-fourth invention is the controller of any one of the first to the twenty-third inventions, wherein the priority degree determiner raises the order of charging priority and the order of discharging priority of a specific secondary battery in the plurality of secondary batteries the most.

A twenty-fifth invention is the controller of any one of the first to the twenty-fourth inventions, wherein the charging/discharging command part stops operations of all or some of the bidirectional converters for controlling the charging/discharging of the secondary batteries to which the charging power or the discharging power is not allocated by the power allocating part.

A twenty-sixth invention is the controller of the twenty-fifth invention, wherein the charging/discharging command part stops the operations of the bidirectional converts other than the bidirectional converters for controlling the charging/discharging of the secondary battery having the highest charging priority degree or the highest discharging priority degree in the secondary batteries to which the charging power or the discharging power is not allocated by the power allocating part.

A twenty-seventh invention is the controller of the twenty-fifth invention, wherein the charging/discharging command part stops the operation of the bidirectional convert for controlling the charging/discharging of the secondary battery having the highest charging priority degree or the highest discharging priority degree in the secondary batteries to which the charging power or the discharging power is not allocated by the power allocating part and restarts the operation before the charging power or the discharging power is newly allocated.

A twenty-eighth invention is a controller network having a plurality of controllers for controlling charging/discharging in a plurality of charging/discharging units, including a high-order controller for controlling charging/discharging in a plurality of first charging/discharging units, and a low-order controller, that is provided to all or some of the first charging/discharging units, for controlling charging/discharging in a second charging/discharging unit, wherein the high-order controller includes a first communication part for communicating with the low-order controller, transmitting the allocated charging power and discharging power to the low-order controller, and receiving an index reflected to the charging priority degree and the discharging priority degree or information necessary for specifying the index from the low-order controller, and a power allocation determiner for reflecting the index received from the first communication part or an index specified based on the information necessary for specifying the index so as to determine the charging priority degree and the discharging priority degree in the first charging/discharging units, allocating the charging power to the first charging/discharging unit in descending manner of the charging priority degree, and allocating the discharging power to the first charging/discharging unit in descending manner of the discharging priority degree, the low-order controller includes a second communication part for communicating with the high-order controller, receiving the allocated charging power and discharging power from the high-order controller, and transmitting the index or information necessary for specifying the index to the high-order controller, the index includes a difference of a target value of the state of charge from a calculated value of the state of charge as a factor, and the power allocating part raises the charging priority degree and lowers the discharging priority degree with the increasing difference of the target value of the state of charge from the calculated value of the states of charge.

A twenty-ninth invention is a control method for controlling charging/discharging in a plurality of secondary batteries, including the steps of (a) measuring a charging/discharging current in each of the plurality of secondary batteries, (b) integrating a measured value of the charging/discharging current measured at the step (a) and calculating discharging capacity in each of the plurality of secondary batteries, (c) calculating a state of charge in each of the plurality of secondary batteries based on the calculated value of the discharging capacity calculated at the step (b), (d) reflecting a first index so as to determine the charging priority degree and the discharging priority degree of each of the plurality of secondary batteries, (e) allocating charging power to the secondary batteries in descending manner of the charging priority degree determined at the step (d) and allocating discharging power to the secondary batteries in descending manner of the discharging priority degree determined at the step (d), (f) commanding charging/discharging of the charging/discharging power allocated at the step (e), and (g) controlling the charging/discharging of each of the plurality of secondary batteries so that the charging/discharging power becomes a commanded value commanded at the step (f), wherein the first index includes a difference of a target value of the state of charge from a state of charge calculated at the step (c) as a factor, and at the step (d), the charging priority degree is raised and the discharging priority degree is lowered with the increasing difference of the target value of the state of charge from the calculated value of the state of charge calculated at the step (c).

Effect of the Invention

According to the present invention, since the charging power is preferentially allocated to the secondary batteries in which the calculated values of the states of charge are greatly smaller than the target values and the discharging power is preferentially allocated to the secondary batteries in which the calculated values of the states of charge are greatly larger than the target values, the states of charge are easily made to be close to the target values.

According to the second and third inventions, the secondary batteries are charged/discharged so that when the temperatures are high, occurrence frequency of the exothermic reaction becomes small, and thus the temperatures of the secondary batteries are stable.

According to the fourth invention, since the discharging power is preferentially allocated to the secondary batteries whose temperatures are at low risk of reaching an upper limit temperature, the temperatures of the secondary batteries are prevented from reaching the upper limit temperature.

According to the fifth invention, since the charging power is preferentially allocated to the secondary batteries that require the correction of the calculated values of the discharging capacities at the charging end, and the discharging power is preferentially allocated to the secondary batteries that do not require the correction of the calculated values of the discharging capacities at the charging end, the calculated values of the discharging capacities are promptly corrected at the charging end.

According to the sixth invention, the charging power is preferentially allocated to the secondary batteries that do not require the correction of the calculated values of the discharging capacities at the discharging end, and the discharging power is preferentially allocated to the secondary batteries that require the correction of the calculated values of the discharging capacities at the discharging end, the calculated values of the discharging capacities are promptly corrected at the discharging end.

According to the seventh invention, since the charging power is preferentially allocated to the secondary batteries that do not arrive at the charging end, and the discharging power is preferentially allocated to the secondary batteries that arrive at the charging end, after the calculated values of the discharging capacities are corrected, the states of charge are easily made to be close to the target values.

According to the eighth invention, the charging power is preferentially allocated to the secondary batteries that arrive at the discharging end, and the discharging power is preferentially allocated to the secondary batteries that do not arrive at the discharging end, after the calculated values of the discharging capacities are corrected, the states of charge are easily made to be close to the target values.

According to the ninth invention, since the charging power and the discharging power are preferentially allocated to the secondary batteries whose usages are low, the usages of the secondary batteries become uniform, and deteriorations of the secondary batteries become uniform, thereby preventing a failure that is caused in any of the plurality of secondary batteries by the deterioration early.

According to the eleventh invention, since even when the first index slightly changes, the belonging charging priority degree segment and discharging priority degree segment do not mostly change, an inconvenience that is caused by a frequent change in the charging priority degree and the discharging priority degree is repressed. Further, since the second index different from the first index is reflected to the intra-segment order of charging priority and the intra-segment order of discharging priority, the charging power and the discharging power are allocated more suitably.

According to the twelfth and thirteenth inventions, since the secondary batteries are charged/discharged so that when the temperatures are high, the occurrence frequency of the exothermic reaction becomes low, the temperatures of the secondary batteries are stable.

According to the fourteenth invention, since the charging power is preferentially allocated to the secondary batteries that require the correction of the calculated values of the discharging capacities at the charging end, and the discharging power is preferentially allocated to the secondary batteries that do not require the correction of the calculated values of the discharging capacities at the charging end, the calculated values of the discharging capacities are promptly corrected at the charging end.

According to the fifteenth invention, the charging power is preferentially allocated to the secondary batteries that do not require the correction of the calculated values of the discharging capacities at the discharging end, and the discharging power is preferentially allocated to the secondary batteries that require the correction of the calculated values of the discharging capacities at the discharging end, the calculated values of the discharging capacities are promptly corrected at the discharging end.

According to the sixteenth invention, the charging power is preferentially allocated to the secondary batteries that do not arrive at the charging end where the calculated values of the discharging capacities are corrected, and the discharging power is preferentially allocated to the secondary batteries that arrive at the charging end where the calculated values of the discharging capacities are corrected. For this reason, after the calculated values of the discharging capacities are corrected, the states of charge are easily made to be close to the target values.

According to the seventeenth invention, the charging power is preferentially allocated to the secondary batteries that arrive at the discharging end where the calculated values of the discharging capacities are corrected, and the discharging power is preferentially allocated to the secondary batteries that do not arrive at the discharging end where the calculated values of the discharging capacities are corrected. For this reason, after the calculated values of the discharging capacities are corrected, the states of charge are easily made to be close to the target values.

According to the eighteenth invention, since the charging power and the discharging power are preferentially allocated to the secondary batteries whose usages are low, the usages of the secondary batteries become uniform, and the deterioration of the secondary batteries becomes uniform, thereby preventing a failure that is caused in any of the plurality of secondary batteries by the deterioration early.

According to the nineteenth invention, since the charging power and the discharging power are preferentially allocated to specific secondary batteries, the specific secondary batteries are intensively deteriorated, and thus maintenance is facilitated.

According to the twentieth invention, since even when the first index slightly changes, the belonging charging priority degree segments and discharging priority degree segments are not mostly changed, an inconvenience that is caused by the frequent change in the charging priority degree segment and the discharging priority degree segment is repressed. Further, the usages of the secondary batteries become uniform, and the deterioration of the secondary batteries becomes uniform, thereby preventing a failure that is caused in any of the plurality of secondary batteries by the deterioration early.

According to the twenty-first invention, an inconvenience that is caused by the frequent change in the charging priority degree segment and the discharging priority degree segment is repressed.

According to the twenty-second and twenty-third inventions, since sudden allocation and sudden cancellation of the allocation of the discharging power or the charging power are repressed, all the charging power or all the discharging power becomes stable.

According to the twenty-fourth invention, since the charging power and the discharging power are preferentially allocated to specific secondary batteries, the specific secondary batteries are intensively deteriorated, and the maintenance is facilitated.

According to the twenty-fifth invention, standby electricity for the bidirectional converters is not necessary, and thus power consumption of the bidirectional converts reduces.

According to the twenty-sixth and twenty-seventh inventions, the standby electricity for the bidirectional converters reduces, and new allocation of the charging power or the discharging power to the secondary battery having the highest charging priority degree or discharging priority degree becomes prompt.

According to the twenty-eighth invention, since the processes executed by one controller reduce, the control of the charging/discharging of many secondary batteries is facilitated.

These and the other objects, features, aspects and advantages of the present invention will be made to be obvious by the detailed description of the presents invention when they are taken into consideration with reference to accompanying drawings.

BRIEF DESCRIPTION OF THE DRAWINGS

FIG. 1 is a block diagram illustrating a power storage facility according to a first embodiment.

FIG. 4 is a diagram illustrating an example of information where a relationship between DOD and temperatures of the NaS batteries is described.

FIG. 5 is a diagram illustrating an example of information where the relationship between DOD and the temperatures of the NaS batteries is described.

FIG. 6 is a diagram describing reflection of orders of charging priority and orders of discharging priority to allocation of charging power and discharging power.

FIG. 7 is a graph describing reflection of the orders of charging priority to allocation of the charging power.

FIG. 8 is a graph illustrating a relationship between a depth of discharge and a voltage in the NaS batteries.

FIG. 9 is a block diagram illustrating components adopted in a second embodiment.

FIG. 13 is a diagram describing determination of the charging priority degree segments and discharging priority degree segments according to a fifth embodiment.

FIG. 14 is a diagram describing the ordering of the intra-segment orders of charging priority and the intra-segment orders of discharging priority according to a sixth embodiment.

FIG. 17 is a diagram describing the charging priority degree segments according to a ninth embodiment.

FIG. 18 is a block diagram illustrating a power storage network according to a tenth embodiment.

FIG. 19 is a block diagram illustrating a high-order controller and a low-order controller according to the tenth embodiment.

EMBODIMENT FOR CARRYING OUT THE INVENTION

Figure 2:
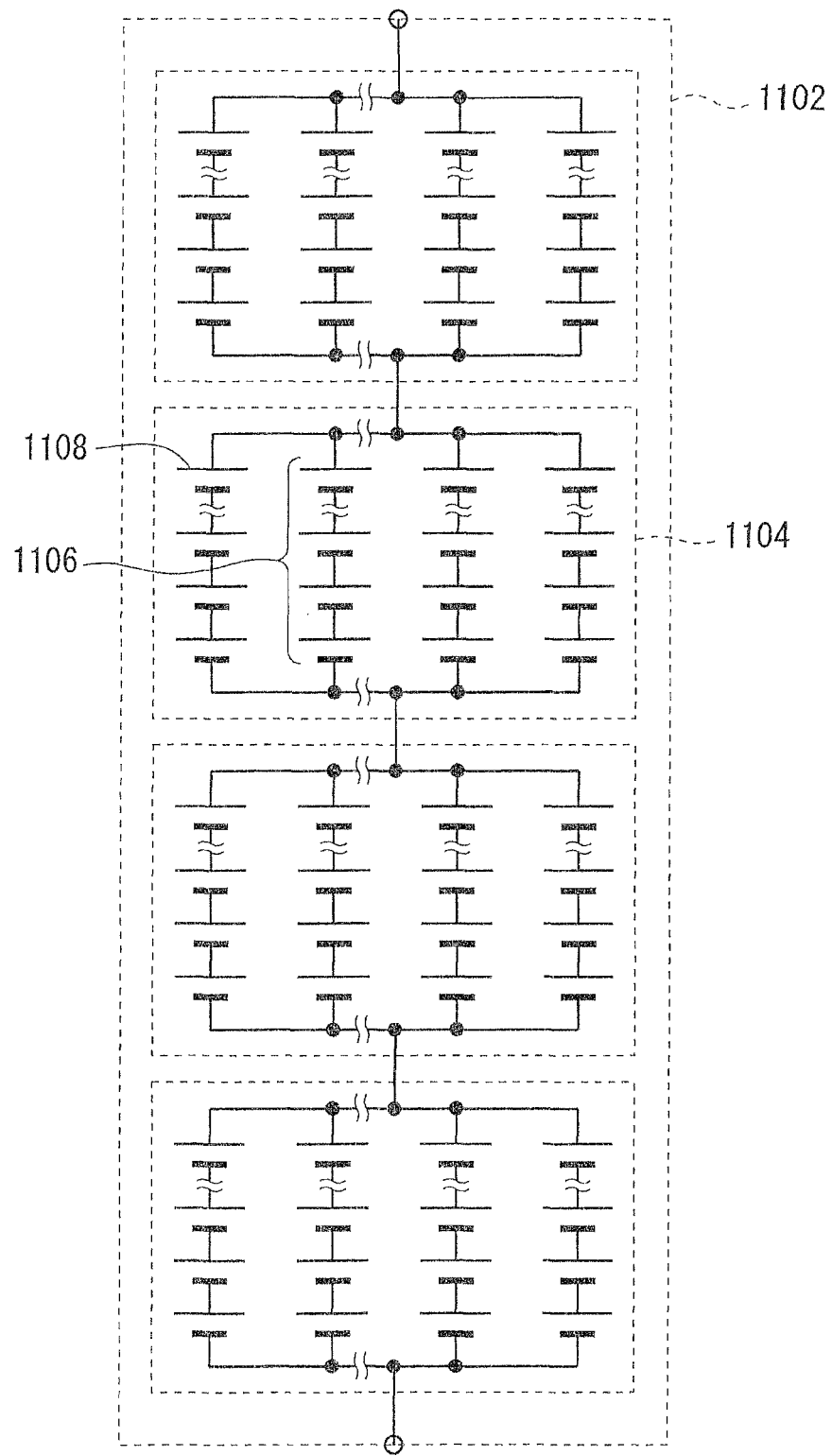
FIG. 2 is a circuit diagram illustrating a module of NaS batteries.

<1 First Embodiment>
(Outline of First Embodiment)

A first embodiment relates to a power storage facility 1002. In the first embodiment, a ordering index that includes a difference ΔSOCm=SOCt-SOCm between a target value SOCt of SOC (state of charge) and a calculated values SOCm of SOC as a main factor are reflected to orders of charging priority and orders of discharging priority of NaS batteries 1004. Further, charging power is allocated to the NaS batteries 1004 in descending manner of the order of charging priority, and discharging power is allocated to the NaS batteries 1004 in descending manner of the order of discharging priority.

(Outline of Power Storage Facility 1002)

FIG. 1 is a block diagram illustrating the power storage facility 1002 according to a first embodiment.

As shown in FIG. 1, the power storage facility 1002 has the NaS batteries 1004 for storing electric power, connecting lines 1006 for connecting a system 1902 and the NaS batteries 1004, electric current detectors 1008 for measuring charging/discharging currents of the NaS batteries 1004, temperature sensors 1010 for measuring temperatures of the NaS batteries 1004, bidirectional converters 1012 for converting electric power supplied from the NaS batteries 1004 to the system 1902 from direct currents into alternating currents and converting electric power supplied from the system 1902 to the NaS batteries 1004 from alternating currents into direct currents, transformers 1014 for boosting the electric power supped from the NaS batteries 1004 to the system 1902 and stepping down the electric power supplied from the system 1902 to the NaS batteries 1004, a control part 1016 for controlling the power storage facility 1002, a display part 1018 for displaying information, and an operating part 1020 for accepting operations.

The connecting lines 1006, the electric current detectors 1008, the temperature sensors 1010, the bidirectional converters 1012, and the transformers 1014 are provided to the plurality of NaS batteries 1004, respectively, and the electric current detectors 1008, the bidirectional converters 1012, and the transformers 1014 are inserted into the connecting lines 1006, respectively. The electric current detectors 1008 are inserted into direct current sides of the bidirectional converters 1012, and the transformers 1014 are inserted into alternating current side of the bidirectional converters 1012, respectively.

Each of the four NaS batteries 1004 forms a charging/discharging unit that enables charging/discharging. FIG. 1 illustrates the four NaS batteries 1004, but the number of the NaS batteries 1004 is increased or decreased according to specifications of the power storage facility 1002. Another kind of secondary batteries may be adopted instead of the NaS batteries 1004.

The electric current detectors 1008, the temperature sensors 1010, the bidirectional converters 1012, the transformers 1014, the control part 1016, the display part 1018, and the operating part 1020 compose a controller for controlling charging/discharging of the plurality of the NaS batteries 1004. The control part 1016 allocates charging power and discharging power to the plurality of NaS batteries 1004 so that entire charging/discharging power of the plurality of NaS batteries 1004 (hereinafter, "all the charging/discharging power") takes set values. The set values of all the charging/discharging power are input from the operating part 1020, or input from a microgrid control system of a microgrid having the power storage facility 1002 via a communication line. In some cases, the set values are set so that input values of the charging/discharging power do not directly become the set values and electric power that is consumed in the power storage facility 1002 can be maintained.

(NaS Battery 1004)

FIG. 2 is a circuit diagram illustrating a module 1102 of the NaS batteries 1004.

As shown in FIG. 2, the module 1102 is a series connecting body in which blocks 1104 are series-connected to each other, and the blocks 1104 are parallel connecting bodies in which strings 1106 are parallel-connected, and the strings 1106 are series connecting bodies in which cells 1108 are series-connected. A number of the blocks 1104 to be series-connected, a number of the strings 1106 to be parallel-connected, and a number of the cells 1108 to be series-connected are increased/decreased according to specifications of the module 1102.

The NaS batteries 1004 have the at least one module 1102. The number of the modules 1102 is increased/decreased according to the specifications of the NaS batteries 1004.

(Electric Current Detector 1008)

The electric current detector 1008 measures charging/discharging currents in each of the plurality of NaS batteries 1004. The charging/discharging power is not directly measured but may be indirectly measured. For example, the charging/discharging power is measured, and measured values of the charging/discharging power may be converted into charging/discharging currents. When the measured values of the charging/discharging power are converted into the charging/discharging currents, for example. AC charging/discharging power is measured on AC sides of the bidirectional converters 1012, and DC charging/discharging voltages are measured on DC sides of the bidirectional converters 1012, so that the charging/discharging currents are calculated based on measured values of the AC charging/discharging power and measured values of the DC charging/discharging voltages.

(Bidirectional Converters 1012)

The bidirectional converter 1012 charges/discharges each of the plurality of NaS batteries 1004 according to charging/discharging commands, and controls charging/discharging of each of the plurality of NaS batteries 1004 so that the charging/discharging power takes a command value.

The bidirectional converters 1012 are called also "PCS (Power Conversion System)" or "AC/DC converters". Mutual conversion between DC and AC in the bidirectional converters 1012 is carried out by PWM (Pulse Width Modulation) inverter or the like.

(Stopping of the Operation of Bidirectional Converter 1012)

The operations of the bidirectional converters 1012 for controlling charging/discharging of the NaS batteries 1004 (hereinafter, "unallocated NaS batteries") to which charging power or discharging power is not allocated may be stopped. As a result, a standby power consumption for the bidirectional converters 1012 is not necessary, and thus a power consumption of the controller reduces.

When the operations of the bidirectional converters 1012 are stopped, all operations of the bidirectional converters 112 for controlling the charging/discharging of the unallocated NaS batteries may be stopped, but some of the bidirectional converters 1012 other than the bidirectional converters 1012 that controls the charging/discharging of the NaS batteries 1004 having highest order of charging priority or order of discharging priority in the unallocated NaS batteries may be stopped. As a result, charging power or discharging power is newly allocated to the NaS batteries 1004 having the highest order of charging priority or order of discharging priority promptly.

The operations of the bidirectional converters 1012 that control the charging/discharging of the NaS batteries 1004 having the highest order of charging priority or order of discharging priority are stopped, and before charging power or discharging power is newly allocated, the operations may be restarted. As a result, the charging power or discharging power is newly allocated to the NaS batteries 1004 having the highest order of charging priority or order of discharging priority promptly.

A timing at which the operations restart is determined by a time required for restarting the operation of the bidirectional converters 1012 and an estimated value of a time up to new allocation of the charging power or discharging power. The estimate value of the time up to the new allocation of the charging power or discharging power is calculated based on an expected value of all the charging/discharging power, chargeable/dischargeable electric power and SOC of the NaS batteries 1004 whose charging/discharging is controlled by the operating bidirectional converters 1012.

(Temperature Sensor 1010)

The temperature sensor 1010 measures a temperature in each of the plurality of NaS batteries 1004.

(Outline of Control Part 1016)

Figure 3:
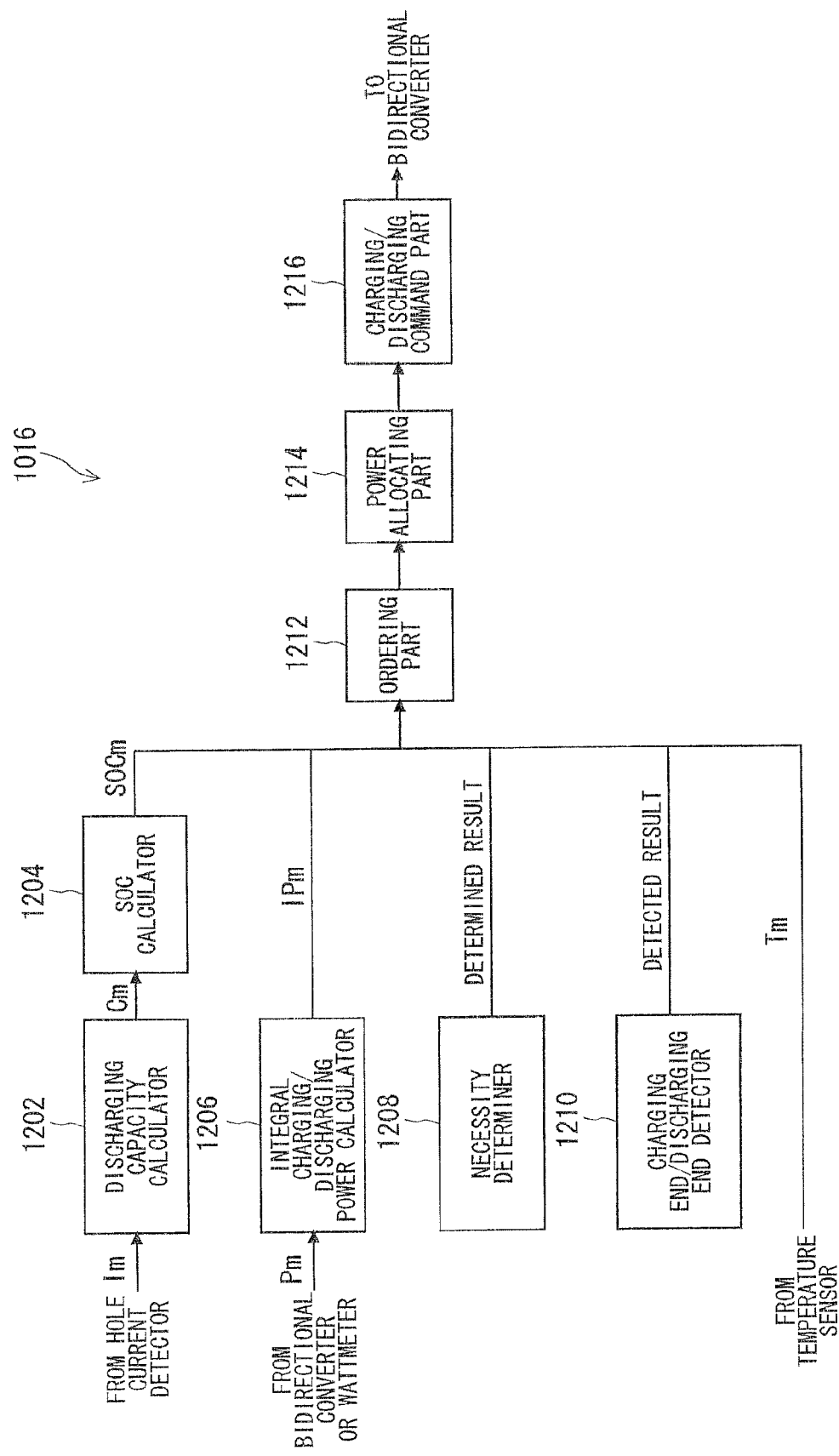
FIG. 3 is a block diagram illustrating a control part.

FIG. 3 is a block diagram illustrating the control part 1016. Respective functions of the control part 1016 may be realized by making a built-in computer having a CPU and a memory execute control programs, or may be realized by hardware.

As shown in FIG. 3, the control part 1016 has a discharging capacity calculator 1202 for calculating discharging capacities of the NaS batteries 1004, an SOC calculator 1204 for calculating SOC of the NaS batteries 1004, an integral charging/discharging power calculator 1206 for calculating integral charging/discharging power of the NaS batteries 1004, a necessity determiner 1208 for determining whether correction of calculated values of the discharging capacities in the NaS batteries 1004 is necessary, a charging end/discharging end detector 1210 for detecting arrival at a charging end or a discharging end at which the calculated values of the discharging capacities are corrected, a ordering part 1212 for giving the orders of charging priority and the orders of discharging priority to the NaS batteries 1004, a power allocating part 1214 for allocating charging power and discharging power to the NaS batteries 1004, and a charging/discharging command part 1216 for commanding the bidirectional converters 1012 to charge/discharge the NaS batteries 1004. "To calculate" includes not only calculation according to operation expressions but also processes such as conversion based on a numerical value table and calculation in an analog computing circuit.

(Discharging Capacity Calculator 1202)

The discharging capacity calculator 1202 integrates measured values Im (m=1, 2, 3, 4; m indicates the numbers of the NaS batteries 1004) of charging/discharging currents measured by the electric current detectors 1008 from the time of previous correction of the calculated values of the discharging capacities to a current time, and calculates the discharging capacities in the plurality of NaS batteries 1004.

"To integrate" means a total sum in a case where a time interval of values to be integrated is discrete, or an integral in a case where the time interval of the values to be integrated is non-discrete. Much the same is true on the following.

(SOC Calculator 1204)

The SOC calculator 1204 calculates SOCs of the plurality of NaS batteries 1004 based on calculated values Cm of the discharging capacities calculated by the discharging capacity calculator 1202 and a rating capacity. "SOC" is a ratio of a residual capacity to the rating capacity, but an amount of one-to-one correspondence to the ratio may be regarded as "SOC".

(Integral Charging/Discharging Power Calculator 1206)

The integral charging/discharging power calculator 1206 integrates the charging/discharging power in each of the plurality of NaS batteries 1004 from a time when use of the NaS batteries 1004 is started to a current time, and calculates the integral charging/discharging power in each of the plurality of NaS batteries 1004. The integral charging/discharging power to be integrated may be calculated values Pm calculated by the bidirectional converters 1012, or may be measured values Pm measured by a power meter inserted into the connecting line 1006. The integral charging/discharging power is one example of a reflecting amount of the usages of the NaS batteries 1004. Therefore, an integral charging/discharging current calculator for calculating integral charging/discharging currents may be provided instead of the integral charging/discharging power calculator 1206. The charging/discharging currents to be integrated may be calculated values Im calculated by the bidirectional converters 1012, or may be measured values Im measured by the electric current detectors 1008. More generally, there is provided a usage reflecting amount calculator for calculating a reflecting amount of the usages of the NaS batteries 1004 based on detected results of detectors, such as the power meters and the electric current detectors 1008, for detecting the use states of the NaS batteries 1004.

(Necessity Determiner 1208)

The necessity determiner 1208 determines whether correction of a calculated value of a discharging capacity in each of the plurality of NaS batteries 1004 at a charging end or a discharging end is necessary. At the time of the determination whether the correction of the calculated values of the discharging capacities is necessary, the calculated values of the discharging capacities in the plurality of NaS batteries 1004 may be corrected sequentially one by one, or errors of the calculated values of the discharging capacities in the plurality of NaS batteries 1004 are estimated, and the calculated values of the discharging capacities of the NaS batteries 1004 whose estimated errors are large may be corrected.

(Charging End/Discharging End Detector 1210)

The charging end/discharging end detector 1210 monitors a voltage of each of the plurality of NaS batteries 1004, and detects the arrival at the charging end or the discharging end at which the calculated values of the discharging capacities in the plurality of NaS batteries 1004 are corrected.

(Ordering Part 1212)

The ordering part 1212 reflects a charging priority ordering index ICm shown in an equation (1) so as to give the order of charging priority to each of the plurality of NaS batteries 1004, and reflecting a discharging priority ordering index IDm shown in an equation (3) so as to give the order of discharging priority to each of the plurality of NaS batteries 1004. The ordering part 1212 raises the order of charging priority with the increasing charging priority ordering index ICm, and raises the order of discharging priority with the increasing discharging priority ordering index IDm.

[Equation 1]

$$ICm = AC \times \Delta SOCm + BC \times \Delta Tm + CC \times IPm + DC \times Sm \quad (1)$$

[Equation 2]

$$BC = f(SOCm) \quad (2)$$

[Equation 3]

$$IDm = AD \times \Delta SOCm + BD \times \Delta Tm + CD \times IPm + DD \times Sm \quad (3)$$

[Equation 4]

$$BD = f'(SOCm) \quad (4)$$

(Principal Factor)

The charging priority ordering index ICm and the discharging priority ordering index IDm include a difference $\Delta SOCm = SOCt - SOCm$ of the target value SOCt of SOC from the calculated value SOCm of SOC calculated by the SOC calculator 1204 as a main factor in a first term. A coefficient AC in the first term of the charging priority ordering index ICm takes a positive value, and a coefficient AD in the first term of the discharging priority ordering index IDm takes a negative value. As a result, the order of charging priority raises and the order of discharging priority lowers with the increasing difference $\Delta SOCm$, charging power is preferentially allocated to the NaS batteries 1004 where the calculated value SOCm of SOC falls to well below the target value SOCt, and the discharging power is preferentially allocated to the NaS batteries 1004 where the calculated value SOCm of SOC greatly exceeds the target value SOCt, thereby easily making SOC close to the target value SOCt.

(First Sub-Factor)

The charging priority ordering index ICm and the discharging priority ordering index IDm include a measured value Tm of a temperature measured by the temperature sensor 1010 as a first sub-factor in a second term. A coefficient BC in the second term of the charging priority ordering index ICm is desirably a function f(SOCm) of the calculated value SOCm of SOC as shown in an equation (2), and the second term of the charging priority ordering index ICm is a product of the coefficient BC and the difference $\Delta Tm = Tt - Tm$ of a target value Tt from the measured value Tm of the temperature.

It is desirable that as the larger calculated value SOCm of SOC is, the larger the function f(SOCm) becomes. This is because in a case where SOCm is relatively small, even when the difference $\Delta T$ becomes large, a phenomenon that the discharge should be stopped due to limitation of temperatures hardly occurs, and thus the coefficient BC is desirably made to be relatively smaller. When SOCm is relatively large and the difference $\Delta T$ becomes large, the phenomenon that the discharge should be stopped due to limitation of temperatures easily occurs, and thus the coefficient BC is desirably made to be relatively larger.

It is desirable that the coefficient in the second term is adjusted according to past results or prediction of a time change in the charging/discharging power required of the power storage facility 1002.

Its reason will be described below. When the coefficient BC in the second term has a negative value, the NaS batteries 1004 where the measured values Tm of the temperatures are high are preferentially charged. When the NaS batteries 1004 are charged, the temperatures of the NaS batteries 1004 lower and $\Delta SOCm$ becomes small, and thus scopes of discharging time and discharging power for enabling the NaS batteries 1004 to be discharged are expanded. Therefore, it is desirable that the coefficient BC in the second term takes a negative value from a viewpoint that the scopes of the discharging time and the discharging power for enabling the NaS batteries 1004 to be discharged are expanded.

On the other hand, when the NaS batteries 1004 are charged, the orders of discharging priority tend to be high, and thus the discharging power is likely to be allocated to the charged NaS batteries 1004. This leads to a problem such that when the coefficient BC in the second term has a negative value, the charging/discharging of the NaS batteries 1004 where the measured values Tm of the temperatures are high is repeated, and thus the temperatures of the NaS batteries 1004 where the measured values Tm of the temperatures are high are further raised by a Joule heat.

On the contrary, when the coefficient BC in the second term has a positive value, the NaS batteries 1004 where the measured values Tm of the temperatures are high are hardly discharged. While the NaS batteries 1004 are not being charged/discharged, the temperatures of the NaS batteries 1004 gradually lower due to heat radiation. The lowering of the temperatures of the NaS batteries 1004 while the charging/discharging is not performed is more gradual than the lowering of the temperatures of the NaS batteries 1004 while the charging is performed. For this reason, from a short-term viewpoint, the scopes of the discharging time and the discharging power for enabling the NaS batteries 1004 to be discharged are expanded more while the charging is performed than while the charging/discharging is not performed.

However, since a Joule heat is not generated while the charging/discharging is not performed, from a long-term viewpoint, the scopes of the discharging time and the discharging power for enabling the NaS batteries 1004 to be discharged are expanded more while the charging/discharging is not performed than while the charging/discharging is repeated.

These means that the coefficient BC in the second term for expanding the scopes of the discharging time and the discharging power for enabling the NaS batteries 1004 to be discharged varies according to the time change in the charging/discharging power required of the power storage facility 1002. Therefore, it is desirable that the coefficient in the second term is set so that the scopes of the discharging time and the discharging power for enabling the NaS batteries 1004 to be discharged can be expanded according to the past results and prediction of the time change in the charging/discharging power required by the power storage facility 1002. Also when the coefficient in the second term is set to "0" the operation of the power storage facility 1002 is mostly and suitably performed.

In some cases, the lowering of the temperatures of the NaS batteries 1004 while the charging/discharging is not performed is more acute than the lowering of the temperatures of the NaS batteries 1004 while the charging is performed depending on the specifications of the NaS batteries 1004. In such a case, the coefficient BC in the second term desirably has a positive value. As a result, the orders of charging priority lower with the increasing measured values Tm of the temperatures. Further, it is not essential that the coefficient BC in the second term is the function of the calculated value SOCm of SOC.

A coefficient BD in the second term of the discharging priority ordering index IDm is desirably the function of the calculated value SOCm of SOC as shown in the equation (4), and the coefficient BD takes a positive value, the second term of the discharging priority ordering index IDm is a product of the coefficient BD and the difference $\Delta Tm = Tt - Tm$. As a result, the order of discharging priority lowers with the increasing measured value Tm of the temperature.

It is desirable that the larger the calculated value SOCm of SOC is, the smaller the function f'(SOCm) is. This is because when SOCm is relatively small and the difference $\Delta T$ becomes large, the phenomenon that the discharging should be stopped due to limitation of temperature hardly occurs, and thus it is desirable that the function f'(SOCm) is made to be relatively large. Further, this is because when SOCm is relatively large and the difference $\Delta T$ becomes large, the phenomenon that the discharging should be stopped due to limitation of temperature easily occurs, and thus it is desirable that the function f'(SOC m) is made to be relatively small.

In order to prevent the temperatures of the NaS batteries 1004 where the measured values Tm of the temperatures become high from being higher, the orders of discharging priority do not have to be given to the NaS batteries 1004 where the measured values Tm of the temperatures are higher than a threshold. Even when the orders of discharging priority are not given, the orders of charging priority are allowed to be given.

Since the NaS batteries 1004 are secondary batteries that cause endothermic reaction at the time of charging and cause exothermic reaction at the time of discharging, the NaS batteries 1004 are charged/discharged so that when the temperatures are high, occurrence frequency of the exothermic reaction becomes low, and the temperatures of the NaS batteries 1004 become stable.

When the secondary batteries that cause the exothermic reaction at the time of charging and cause the endothermic reaction at the time of discharging are employed, the orders of charging priority should lower with the increasing measured values Tm of the temperatures, and thus the coefficient BC in the second term of the charging priority ordering index ICm takes a positive value. It is desirable that the coefficient BC in the second term is the function of the calculated value SOCm of SOC as shown in the equation (2). It is desirable that the larger the calculated value SOCm of SOC becomes, the smaller the function f(SOCm) becomes. This is because when SOCm is relatively large and the difference $\Delta Tm$ becomes large, the phenomenon that the charging should be stopped due to limitation of temperature hardly occurs, and thus it is desirable that the function f(SOCm) is made to be relatively large. Further, this is because when SOCm is relatively small and the difference $\Delta Tm$ becomes large, the phenomenon that the charging should be stopped due to limitation of temperature easily occurs, and thus it is desirable that the function f(SOCm) is made to be relatively small.

Instead of the discharging priority ordering index IDm shown in an equation (3), the discharging priority ordering index IDm shown in an equation (5) may be used. In the discharging priority ordering index IDm shown in the equation (5), the second term $BD \times \Delta Tm$ in the equation (3) is replaced by a function f"(SOCm,Tm) of the calculated value SOCm of SOC and the measured values Tm of the temperatures.

[Equation 5]

$$IDm = AD \times \Delta SOCm + f''(SOCm, Tm) + CD \times IPm + DD \times Sm \ldots \quad (5)$$

When the discharging priority ordering index IDm shown in the equation (5) is used, a first upper limit value U1m and a second upper limit value U2m of discharging power are set in each of the plurality of NaS batteries 1004. The first upper limit value U1m is a maximum value of the discharging power determined by the specifications of the NaS batteries 1004 and specifications of discharging routes from the NaS batteries 1004, and the power allocating part 1214 allocates the discharging power not more than the first upper limit value U1m to each of the plurality of NaS batteries 1004. The second upper limit value U2 is a maximum value of the discharging power that maintains the temperatures of the NaS batteries 1004 at the upper limit temperature or less. The second upper limit value U2m is set to the first upper limit value U1m or less. The first upper limit value U1m may be uniform in all the plurality of NaS batteries 1004, or may vary among all or some of the plurality of NaS batteries 1004. Also the second upper limit value U2m may be uniform in all the plurality of NaS batteries 1004, or may vary among all or some of the plurality of NaS batteries 1004.

The function f"(SOCm,Tm) includes a ratio U2m/U1m of the second upper limit value U2m to the first upper limit value U1m as a factor, and the function becomes larger with the increasing ratio U2m/U1m. Therefore, the orders of discharging priority rise with the increasing ratio U2m/U1m.

The second upper limit value U2m is a maximum value of the discharging power for enabling continuous discharging until DOD (a depth of discharge) reaches 100%.

FIG. 4 is a diagram illustrating example of information referred to by the ordering part 1212 in which a relationship between DOD and the temperatures of the NaS batteries 1004 at the time of discharging is described. In FIG. 4, DOD is plotted along an abscissa axis and the temperatures are plotted along an ordinate axis, changes in DOD and the temperatures in a case where discharging power of 1.0 MW, 0.8 MW and 0.6 MW is discharged from an initial state such that DOD is 0% and the temperatures are 300° C. are indicated by DOD-temperature characteristic lines 1912, 1914 and 1916, and a change in DOD and the temperatures in a case where a discharging power of 0.8 MW is discharged from an initial state such that DOD is 30% and the temperatures are 305° C. is indicated by a DOD temperature characteristic line 1918.

When the ordering part 1212 refers to the reference information shown in FIG. 4 in which the relationship between DOD and the temperatures of the NaS batteries 1004 is described, it is found from the DOD-temperature characteristic line 1916 that for example, when the measured values Tm of the temperatures are 300° C. and calculated values DODm of DOD are 0% and the discharging power is set to 0.6

MW or less, the temperatures are maintained at 340° C. or less as the upper limit temperature and thus that the continuous discharging is enabled until DOD reaches 100%, namely, the second upper limit value U2m should be set to 0.6 MW. Further, it is found from the DOD-temperature characteristic line 1918 that when the measured values Tm of the temperatures are 305° C. and the calculated values DOD of DOD are 30% and the discharging power is set to 0.8 MW or less, the temperatures are maintained at 340° C. or less as the upper limit temperature, and thus the continuous discharging is enabled until DOD reaches 100%, namely, the second upper limit value U2m should be set to 0.8 MW.

In general, a DOD-temperature characteristic line from the initial state such that the temperatures are the measured values Tm and DOD is the calculated values DODm to an end state such that the temperatures are the upper limit temperatures or less and DOD is 100% is specified, and discharging power for changing the temperatures and DOD of the NaS batteries 1004 along the specified DOD-temperature characteristic line are specified, so that the second upper limit value U2m of the discharging power for enabling the continuous discharging while the temperatures are maintained at the upper limit temperatures or less and DOD reaches 100% is specified.

Even when the NaS batteries 1004, whose initial state is included in a scope 1922 where the temperatures are lower than a DOD-temperature characteristic line 1920 that represents changes in temperatures and DOD of the NaS batteries 1004 at a time when the discharging power matches with the first upper limit value U1m and that is into the end state such that the temperatures are the upper limit temperatures and DOD is 100%, continuously discharge the discharging power matching with the first upper limit value U1m until DOD reaches 100%, the temperatures do not reach the upper limit temperatures. For this reason, the second upper limit value U2m matches with the first upper limit value U1m.

The temperatures of the NaS batteries 1004 are maintained between a lower limit temperature and the upper limit temperature, and DOD of the NaS batteries 1004 is between 0% and 100%.

Due to influences of heat capacities and thermal resistances of the NaS batteries 1004, even when the discharging of the electric power from the NaS batteries 1004 is stopped, the rise in the temperatures of the NaS batteries 1004 does not immediately stop, and thus "the upper limit temperature" is desirably set to a value lower than the maximum temperature below which the NaS batteries 1004 normally operate.

As shown in FIG. 5, the second upper limit value U2m having high accuracy is calculated even based on a linear-type DOD-temperature characteristic line 1924 that roughly traces the change states of the NaS batteries 1004, but the second upper limit value U2m having higher accuracy is calculated based on a curved DOD-temperature characteristic line 1926 that definitely traces the change states of the NaS batteries 1004. The DOD-temperature characteristic line 1926 shown in FIG. 5 has a bow shape such that a change ratio of the temperature to DOD becomes low just after the initial state. The change ratio of the temperature to DOD lows just after the initial state due to the influences of the heat capacities and the thermal resistances of the NaS batteries 1004.

Instead of the maximum value of the discharging power for enabling the continuous discharging until DOD reaches 100%, a maximum value of the discharging power for enabling the continuous discharging until a set time passes may be used as the second upper limit value U2m.

(Second Sub-Factor)

The charging priority ordering index ICm and the discharging priority ordering index IDm include the calculated value IPm of the integral charging/discharging power calculated by the integral charging/discharging power calculator 1206 as a second sub-factor in a third term. A coefficient CC in a third term of the charging priority ordering index ICm and a coefficient CD in a third term of the discharging priority ordering index IDm take negative values. As a result, the order of charging priority and the order of discharging priority rise with the decreasing calculated value IPm of the integral charging/discharging power. As a result, since the charging power and the discharging power are preferentially allocated to the NaS batteries 1004 with the decreasing integral charging/discharging power, the integral charging/discharging power of the NaS batteries 1004 becomes uniform, and thus the NaS batteries 1004 are uniformly deteriorated.

When an integral charging/discharging current calculator is provided instead of the integral charging/discharging power calculator 1206, the charging priority ordering index ICm and the discharging priority ordering index IDm include the calculated values of the integral charging/discharging currents as second sub-factors instead of the calculated values IPm of the integral charging/discharging power, and the charging power and the discharging power are preferentially allocated to the NaS batteries 1004 with smaller integral charging/discharging currents. More generally, the charging priority ordering index ICm and the discharging priority ordering index IDm include a reflecting amount of the usages calculated by the usage reflecting amount calculator as the second sub-factor, and the charging power and the discharging power are preferentially allocated to the NaS batteries 1004 having smaller usages.

(Third and Fourth Sub-Factors)

When the calculated values of the discharging capacities are corrected at the charging end, the charging priority ordering index ICm and the discharging priority ordering index IDm include the determined result of the necessity determiner 1208 as a third factor in a fourth term, and the detected result of the charging end/discharging end detector 1210 as a fourth factor in the fourth term. A coefficient DC in the fourth term of the charging priority ordering index ICm takes a negative value, and a coefficient DD in the fourth term of the discharging priority ordering index IDm takes a positive value. When the necessity determiner 1208 determines that the correction of the calculated values of the discharging capacities at the charging end is necessary, a value Sm representing a state of the correction of the calculated values of the discharging capacities changes from 0 into −1, and when the charging end/discharging end detector 1210 detects the arrival at the charging end, the value Sm changes from −1 into 1, and when SOC is close to the target value SOCt, the value Sm changes from 1 into 0. As a result, the necessity determiner 1208 determines that the correction of the calculated values of the discharging capacities at the charging end is necessary, the orders of charging priority rise and the orders of discharging priority lower. Further, when the charging end/discharging end detector 1210 detects the arrival at the charging end, the orders of charging priority lower and the orders of discharging priority rise. As a result, the charging power is preferentially allocated to the NaS batteries 1004 requiring the correction of the calculated values of the discharging capacities at the charging end, and the discharging power is preferentially allocated to the NaS batteries 1004 that do not require the correction of the calculated values of the discharging capacities at the charging end. For this reason, the calculated values of the discharging capacities at the charging end are promptly corrected. Further, since the charging power is preferentially allocated to the NaS batteries 1004 that do not arrives at the charging end and the discharging power is preferentially allocated to the NaS batteries 1004 that arrive at the charging end, after the calculated values of the discharging capacities are corrected at the charging end, SOC is easily made to be close to the target value.

When the calculated values of the discharging capacities are corrected at the discharging end and the necessity determiner 1208 determines that the correction of the calculated values of the discharging capacities at the discharging end is necessary, the orders of charging priority should lower and the orders of discharging priority should rise. Further, when the charging end/discharging end detector 1210 detects the arrival at the discharging end, the orders of charging priority should rise and the orders of discharging priority should lower. For this reason, the coefficient DC in the fourth term of the charging priority ordering index ICm takes a positive value, and the coefficient DD in the fourth term of the discharging priority ordering index IDm takes a negative value. When the necessity determiner 1208 determines that the correction of the calculated values of the discharging capacities at the discharging end is necessary, the value Sm representing the correcting state of the calculated values of the discharging capacities changes from 0 into −1, when the charging end/discharging end detector 1210 detects the arrival at the discharging end, the value Sm changes from −1 into 1, and when SOC is close to the target value SOCt, the value Sm changes from 1 into 0. As a result, since the charging power is preferentially allocated to the NaS batteries 1004 that do not require the correction of the calculated values of the discharging capacities at the discharging end and the discharging power is preferentially allocated to the NaS batteries 1004 that require the correction of the calculated values of the discharging capacities at the discharging end, the calculated values of discharging capacities at the discharging end are promptly corrected. Further, since the charging power is preferentially allocated to the NaS batteries 1004 that arrive at the discharging end and the discharging power is preferentially allocated to the NaS batteries 1004 that do not arrive at the discharging end, after the calculated values of the discharging capacities are corrected, SOC is easily made to be close to the target value.

(Level of Factor Contribution)

Absolute values of the coefficients AC, BC, CC and DC represent levels of contribution of the main factor, the first sub-factor, the second sub-factor, and the third and fourth sub-factors to the order of charging priority. Further, absolute values of the coefficients AD, BD, CD and DD represent levels of contribution of the main factor, the first sub-factor, the second sub-factor, and the third and fourth sub-factors to the order of charging priority. In a case where the order of charging priority is raised with the decreasing charging priority ordering index ICm, positive and negative of the coefficients AC, BC, CC and DC are inverted, and in a case where the order of discharging priority is raised with the decreasing discharging priority ordering result IDm, positive and negative of the coefficients AD, BD, CD and DD are inverted.

(Deletion and Addition of Factors)

The charging priority ordering index ICm shown in the equation (1) and the discharging priority ordering index IDm shown in the equation (3) are examples, and they are changed according to the specifications of the power storage facility 1002. Particularly, it is deservingly expected that all or some of the first to third sub-factors are deleted and sub-factors other than the first to third sub-factors are added.

(Sharing of Charging Priority Ordering Index ICm and Discharging Priority Ordering Index IDm)

Factors that contribute to the rise in one of the order of charging priority and the order of discharging priority and the lowering of the other, and factors that contribute to the rise or the lowering of both the order of charging priority and the order of discharging priority are mixed in the factors included in the charging priority ordering index ICm shown in the equation (1) and the discharging priority ordering index IDm shown in the equation (3). For this reason, the charging priority ordering index ICm and the discharging priority ordering index IDm are separately determined.

However, if such mixing is solved, the charging priority ordering index ICm and the discharging priority ordering index IDm may be commonalized. When they are commonalized, the order of charging priority is required to be raised and the order of discharging priority is required to be lowered with the increasing commonalized index, or the order of charging priority is required to be raised and the order of discharging priority is required to be lowered with the decreasing commonalized index.

(Power Allocating Part 1214)

The power allocating part 1214 allocates the charging power to the NaS batteries 1004 in descending manner of the orders of charging priority given by the ordering part 1212, and allocates the discharging power to the NaS batteries 1004 in descending manner of the orders of discharging priority given by the ordering part 1212. In the case where the charging power is allocated to the plurality of NaS batteries 1004, when unallocated charging power is more than the maximum charging power of the NaS battery 1004, the maximum charging power is allocated, and when the unallocated charging power is equal to the maximum charging power of the NaS battery 1004 or less than the maximum charging power of the NaS battery 1004, all the unallocated charging power is allocated. Similarly, in the case where the discharging power is allocated to the plurality of NaS batteries 1004, when unallocated discharging power is more than maximum discharging power of the NaS battery 1004, the maximum discharging power is allocated, and when the unallocated discharging power is equal to the maximum discharging power of the NaS battery 1004 or less than the maximum discharging power of the NaS battery 1004, all the unallocated discharging power is allocated.

For example, when all the charging power that should be allocated is 1.5 MW and the maximum charging power of each of the plurality of NaS batteries 1004 is 1 MW, the charging power of 1 MW that is equal to the maximum charging power is allocated to the NaS battery 1004 with first order of charging priority, the residual charging power of 0.5 MW is allocated to the NaS battery 1004 with the second order of charging priority, and no charging power is allocated to the NaS batteries 1004 with the third and fourth orders of charging priority.

(Reflection of Orders of Charging Priority and Orders of Discharging Priority to Allocation of Charging Powers and Discharging Powers)

FIG. 6 is a graph describing reflection of the orders of charging priority and the orders of discharging priority to the allocation of the charging power and the discharging power. FIG. 7 is a graph describing reflection of the orders of charging priority to the allocation, of the charging power. In the graphs of FIG. 6 and FIG. 7, time is plotted along an abscissa axis, and all charging/discharging power is plotted along an ordinate axis. Positive all charging/discharging power represents all the charging power, and negative charging/discharging power represents all the discharging power. In the graphs of FIG. 6 and FIG. 7, the charging power and the discharging power allocated to the NaS batteries A, B, C and D are expressed by specific hatchings, respectively.

In a case where the orders of charging priority of the NaS batteries A, B, C and D become smaller in this order, when all the charging power increases as shown in FIG. 6, the charging power is allocated to the NaS batteries A, B, C and D in this order, and when all the charging power decreases, the allocation of the charging power to the NaS batteries D, C, B and A is cancelled in this order.

Similarly, in a case where the orders of discharging priority of the NaS batteries D, C, B and A become lower in this order, when all the discharging power increases as shown in FIG. 6, the discharging power is allocated to the NaS batteries D, C, B and A in this order, and when all the discharging power decreases, the allocation of the discharging power to the NaS batteries A, B, C and D is cancelled in this order.

When a state that the orders of charging priority of the NaS batteries A, B, C and D become lower in this order shifts to a state that the orders of charging priority of the NaS batteries B, A, C and D become lower in this order at timing T, as shown in FIG. 7, the change in the orders of charging priority is reflected immediately to the allocation of the charging power. The same is true on the allocation of the discharging power. "Immediately" allows a delay of the reflection by time required for measuring and calculating processes.

(Charging/Discharging Command Part 1216)

The charging/discharging command part 1216 commands the bidirectional converters 1012 to charge/discharge the charging/discharging power allocated by the power allocating part 1214.

Further, the charging/discharging command part 1216 outputs, to the bidirectional converters 1012, a command for charging/discharging the NaS batteries 1004 determined that the correction of the calculated values of the discharging capacities is necessary by the necessity determiner 1208 up to the charging end or the discharging end where the calculated values of the discharging capacities are corrected.

Further, the charging/discharging command part 1216 controls stopping and restarting of the operations of the bidirectional converters 1012.

(Correction of Calculated Values of Discharging Capacities)

FIG. 8 is a graph illustrating a relationship between the depth of discharge and the voltages in the NaS batteries 1004.

As shown in FIG. 8, at the charging end (around a left end of the graph in FIG. 8) in a two-phase region where sodium sulfide ($Na_2S_5$) and elemental sulfur (S) are present as cathode active materials, the voltages of the NaS batteries 1004 become higher with progression of the charging. In two-phase regions other than the charging end, the voltages are generally constant regardless of the depth of discharge. At the discharging end (around a right end of the graph in FIG. 8) in a one-phase region where only sodium sulfide ($Na_2S_x$) is present as a cathode active material, the voltages of the NaS batteries 1004 become lower with progression of the discharging.

The calculated values of the discharging capacities are corrected in a state that the NaS batteries 1004 are charged up to the charging end, or in a state that the NaS batteries 1004 are discharged up to the discharging end (the depth of discharge included in the one-phase region).

(Operation of Power Storage Facility 1002 and Target Value SOCt of SOC)

The form of the operation of the power storage facility 1002 is roughly divided into a pattern operation and a power smoothing operation.

The pattern operation is an operation for charging/discharging according to a fluctuation in a daily power demand. For example, the pattern operation is generally performed in a manner that charging is carried out during the night at which the power demand is low, and discharging is carried out during the day where the power demand is high. When the pattern operation is performed, hourly charging/discharging power is mostly set in advance.

The power smoothing operation is an operation for charging/discharging according to a fluctuation in a shorter power demand. When the power storage facility 1002 performs the power smoothing operation, the target value SOCt of SOC is mostly set to about 50%.

In both the pattern operation and the power smoothing operation, when the calculated values of the discharging capacities in the NaS batteries 1004 are corrected at the charging end, the target value SOCt of SOC is temporarily set to about 100%, and when the calculated values of the discharging capacities in the NaS batteries 1004 are corrected at the discharging end, the target value SOCt is temporarily set to about 0%.

(Manual Operation of Power Storage Facility 1002)

The charging power and discharging power may be manually allocated to the plurality of NaS batteries 1004.

In order to enable the manful allocation of the charging power and the discharging power, the power storage facility 1002 displays the orders of discharging priority and the orders of charging priority on a display part 1115, and the operating part 1020 accepts input of the allocation of the charging power and the discharging power. In addition to the orders of discharging priority and the orders of charging priority, allocation of recommended charging power and discharging power may be displayed on the display part 1115. The charging power and discharging power whose input is accepted by the operating part 1020 are transmitted to a charging/discharging command part 1236.

<2 Second Embodiment>

(Outline of Second Embodiment)

A second embodiment relates to a segment determiner 2004, an intra-segment ordering part 2006, and a power allocating part 2008 that are employed instead of the ordering part 1212 and the power allocating part 1214 according to the first embodiment. A main difference between the first embodiment and the second embodiment is a form of determining orders of charging priority and orders of discharging priority of the NaS batteries 1004. In the second embodiment, a segment determining index Jm that includes a difference $\Delta SOCm = SOCt - SOCm$ between the target value SOCt of SOC and the calculated value SOCm of SOC as a main factor is reflected to belonging charging priority degree segments and discharging priority degree segments to which the NaS batteries 1004 belong, and an intra-segment ordering index Km is reflected to intra-segment orders of charging priority and intra-segment orders of discharging priority of the NaS batteries 1004. Further, the charging power is allocated to the NaS batteries 1004 in descending manner of the belonging charging priority degree segments, and allocates the discharging power to the NaS batteries 1004 in descending manner of the belonging discharging priority degree segments. Further, the charging power is allocated to the NaS batteries 1004 belonging to the same charging priority degree segment in descending manner of the intra-segment orders of charging priority, and the discharging power is allocated to the NaS batteries 1004 belonging to same discharging priority degree segment in descending manner of the intra-segment orders of discharging priority.

"The charging priority degrees" and "the discharging priority degrees" in the first embodiment are "the orders of charging priority" and "the orders of discharging priority", respectively, and in the first embodiment, same "orders of charging priority" and "orders of discharging priority" are not given to the two or more NaS batteries 1004 in an overlapped manner. On the other hand, "the charging priority degrees" and "the discharging priority degrees" in the second embodiment are "the charging priority degree segments" and "the discharging priority degree segments", respectively, and in the second embodiment, the two or more NaS batteries 1004 occasionally belong to the same "charging priority degree segment" and "discharging priority degree segment" in an overlapped manner.

(Outline)

As shown in FIG. 9, in the second embodiment, the segment determiner 2004 for determining the charging priority degree segments and the discharging priority degree segments to which the NaS batteries 1004 belong, the intra-segment ordering part 2006 for giving the intra-segment orders of charging priority and the intra-segment orders of discharging priority to the NaS batteries 1004 in each charging priority degree segment and the discharging priority degree segment, and a power allocating part 2008 for allocating the charging power and the discharging power to the NaS batteries 1004 are provided.

(Segment Determiner 2004)

The segment determiner 2004 reflects the segment determining index Jm shown in an equation (6), carry out stratification of the plurality of NaS batteries 1004, and determines the charging priority degree segment and the discharging priority degree segment to which each of the plurality of NaS batteries 1004 belongs. The segment determiner 2004 raises the charging priority degree segment and lowers the discharging priority degree segment with the increasing segment determining index Jm.

[Equation 6]

$$Jm = \Delta SOCm \quad (6)$$

(Segment Determining Index Jm)

The segment determining index Jm includes the difference $\Delta SOCm = SOCt - SOCm$ of the target value SOCt of SOC from the calculated value SOCm of SOC calculated by the SOC calculator 1204 as a main factor in a first term. As a result, the charging priority degree segment rise and the discharging priority degree segment lower with the increasing difference $\Delta SOCm$, the charging power is preferentially allocated to the NaS batteries 1004 where the calculated value SOCm of SOC is greatly smaller than the target value SOCt, and the discharging power is preferentially allocated to the NaS batteries 1004 where the calculated value SOCm of SOC greatly exceeds the target value SOCt, thereby easily making SOC close to the target value SOCt.

The segment determining index Jm may include a sub-factor that is similar to the sub-factor included in the charging priority ordering index ICm and the discharging priority ordering index IDm according to the first embodiment. In this case, however, as described in "Sharing of the charging priority ordering index ICm and the discharging priority ordering index IDm" in the first embodiment, the index for giving the charging priority degree and the index for giving the discharging priority degree should be separate in some cases.

(Charging Priority Degree Segments and Discharging Priority Degree Segments)

Figures 10, 11, 12:
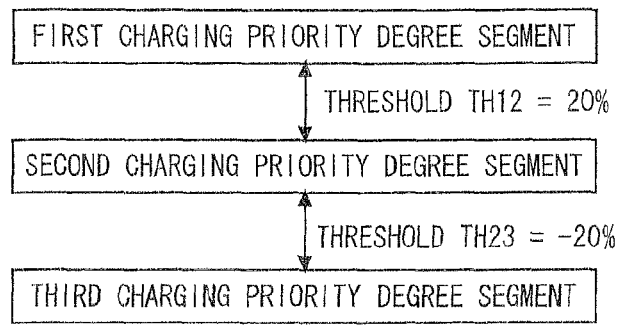
FIG. 10 is a diagram describing charging priority degree segments according to the second embodiment.
FIG. 11 is a diagram describing the ordering of intra-segment orders of charging priority and intra-segment orders of discharging priority according to a third embodiment.
FIG. 12 is a diagram describing the ordering of the orders of charging priority and the orders of discharging priority according to a fourth embodiment.

FIG. 10 is a diagram describing the charging priority degree segments according to the second embodiment.

The plurality of the charging priority degree segments are separated by a threshold of the segment determining index Jm. For example, when the three charging priority degree segments are present, as shown in FIG. 10, a threshold TH12 for separating a first charging priority segment and a second charging priority degree segment is 20%, and a threshold TH23 for separating the second charging priority degree segment and a third charging priority degree segment is −20%. In this case, the NaS batteries 1004 where $\Delta SOCm \geq 20\%$ belong to the first charging priority degree segment, the NaS batteries 1004 where $20\% \geq \Delta SOCm \geq -20\%$ belong to the second charging priority degree segment, and the NaS batteries 1004 where $-20\% \geq \Delta SOCm$ belong to the third charging priority degree segment.

The discharging priority degree segments are also separated by a threshold of the segment determining index Jm similarly to the charging priority degree segments.

As a result, even if the segment determining index Jm slightly changes, the belonging charging priority degree segment and discharging priority degree segment do not mostly change, and thus inconveniences that are caused by frequent changes in the charging priority degree segments and the discharging priority degree segments are repressed.

(Intra-Segment Ordering Part 2006)

The intra-segment ordering part 2006 reflects the intra-segment ordering index Km shown in an equation (7), and gives intra-segment orders of charging priority to the NaS batteries 1004 in each charging priority degree segment, and gives the intra-segment orders of discharging priority to the NaS batteries 1004 in each discharging priority degree segment. The intra-segment ordering part 2006 raises the intra-segment order of charging priority and the intra-segment order of discharging priority with the decreasing intra-segment ordering index Km.

[Equation 7]

$$Km = IPm \quad (7)$$

(Intra-Segment Ordering Index Km)

The intra-segment ordering index Km includes the calculated value IPm of integrated charging/discharging power calculated by the integral charging/discharging power calculator 1206 as a first factor. As a result, the intra-segment order of charging priority and the intra-segment order of discharging priority rise with the decreasing calculated value IPm of the integral charging/discharging power. As a result, since the charging power and discharging power are preferentially allocated to the NaS batteries 1004 with less integral charging/discharging power, the integral charging/discharging power of the NaS batteries 1004 becomes uniform, and the NaS batteries 1004 are uniformly deteriorated. Instead of the integral charging/discharging power, a reflecting amount of the usage such as the integral charging/discharging current is included as a first factor in the intra-segment ordering index Km, and charging power and discharging power may be preferentially allocated to the NaS batteries 1004 with less usage.

(Relationship between Segment Determining Index Jm and Intra-Segment Ordering Index Km)

The intra-segment ordering index Km is an index different from the segment determining index Jm, and does not overlap with the facto included in the intra-segment ordering index Km and the factor included in the segment determining index Jm. As a result, since the intra-segment ordering index Km different from the segment determining index Jm is reflected to the intra-segment order of charging priority and the intra-segment order of discharging priority, the charging power and the discharging power are allocated more suitably.

(Another Factor Include in Intra-Segment Ordering Index Km)

As long as the intra-segment ordering index Km is different from the segment determining index Jm, instead of or in addition to the first factor, the intra-segment ordering index Km may include following second to fourth factors or may include factors other than the second to fourth factors. In this case, however, as described in "sharing of the charging priority ordering index ICm and the discharging priority ordering index IDm" in the first embodiment, the index for ordering the intra-segment order of charging priority and the index for ordering the intra-segment order of discharging priority should be separated in some cases.

That is, the intra-segment ordering index Km may include the measured value Tm of the temperature measured by the temperature sensor 1010 as the second factor, and the intra-segment ordering part 2006 may raise the intra-segment order of charging priority and lower the intra-segment order of discharging priority with the increasing measured value Tm of the temperature.

When the calculated value of the discharging capacity is corrected at the charging end, the intra-segment ordering index Km may include the determined result of the necessity determiner 1208 as the third factor, and when the necessity determiner 1208 determines that the correction of the calculated value of the discharging capacity at the charging end is necessary, the intra-segment ordering part 2006 may raise the intra-segment order of charging priority and may lower the intra-segment order of discharging priority.

Further, when the calculated value of the discharging capacity is corrected at the charging end, the intra-segment ordering index Km may include the detected result of the charging end/discharging end detector 1210 as the fourth factor, and when the charging end/discharging end detector 1210 detects the arrival at the charging end, the intra-segment ordering part 2006 may lower the intra-segment order of charging priority and raise the intra-segment order of discharging priority.

When secondary batteries that cause exothermic reaction at the time of charging and cause endothermic reaction at the time of discharging are employed, the intra-segment ordering part 2006 lowers the intra-segment order of charging priority with the increasing measured values Tm of the temperatures.

When the calculated value of the discharging capacity is corrected at the discharging end and the necessity determiner 1208 determines that the correction of the calculated value of discharging capacity at the discharging end is necessary, the intra-segment ordering part 2006 lowers the intra-segment order of charging priority and raises the intra-segment order of discharging priority.

Further, when the calculated values of the discharging capacities are corrected at the discharging end and the charging end/discharging end detector 1210 detects the arrival at the discharging end, the intra-segment ordering part 2006 raises the intra-segment orders of charging priority and lowers the intra-segment orders of discharging priority.

The factor included in the intra-segment ordering index Km produces the effect similar to the case where the factor is included in the charging priority ordering index ICm and the discharging priority ordering index IDm in the first embodiment.

(Power Allocating Part 2008)

The power allocating part 2008 allocates the charging power to the NaS batteries 1004 in descending manner of the belonging charging priority degree segments determined by the segment determiner 2004, and allocates the discharging power to the NaS batteries 1004 in descending manner of the belonging discharging priority degree segments determined by the segment determiner 2004. Further, the power allocating part 2008 allocates the charging power to the NaS batteries 1004 belonging to the same charging priority degree segment in descending manner of the intra-segment orders of charging priority given by the intra-segment ordering part 2006, and allocates the discharging power to the NaS batteries 1004 in the same belonging discharging priority degree segment in descending manner of the intra-segment orders of discharging priority given by the intra-segment ordering part 2006.

<3 Third Embodiment>

A third embodiment relates to ordering of intra-segment orders of charging priority and intra-segment orders of discharging priority that is employed instead of the ordering of the intra-segment orders of charging priority and the intra-segment orders of discharging priority according to the second embodiment.

FIG. 11 is a diagram describing the ordering of the intra-segment orders of charging priority according to the third embodiment. FIG. 11 illustrates the intra-segment orders of charging priority of NaS batteries 1, 2, . . . , n when times T1, T2, T3, T4, . . . pass.

As shown in FIG. 11, at the time of the ordering of the intra-segment orders of charging priority according to the third embodiment, when time passes, the intra-segment orders of charging priority are replaced cyclically. The intra-segment orders of discharging property are ordered similarly.

<4 Fourth Embodiment>

A fourth embodiment relates to ordering of orders of charging priority and orders of discharging priority that are given instead of ordering of the orders of charging priority and the orders of discharging priority according to the first embodiment.

FIG. 12 is a diagram describing the ordering of the orders of charging priority and the orders of discharging priority according to the fourth embodiment. FIG. 12 illustrates the orders of charging priority and the orders of discharging priority of the specific m-numbered NaS batteries 1004 (hereinafter, "the specific NaS batteries") and the NaS batteries 1004 other than the specific NaS batteries (hereinafter, "the unspecific NaS batteries").

As shown in FIG. 12, when the orders of charging priority and the orders of discharging priority are given in the fourth embodiment, the highest order of charging priority and order of discharging priority are given to the specific NaS batteries. That is, the first to mth orders of charging priority and orders of discharging priority are given to the specific NaS batteries, and the m+1st to m+nth orders of charging priority and orders of discharging priority are given to the unspecific NaS batteries. As a result, since the charging power and discharging power are preferentially given to the specific NaS batteries, specific NaS batteries 1004 are deteriorated intensively, thereby facilitating the maintenance.

The orders of charging priority and the orders of discharging priority given to the specific NaS batteries may be fixed, but the charging priority ordering index ICm and the discharging priority ordering index IDm may be reflected thereto, or they may be replaced cyclically when time passes.

Similarly to the first embodiment, the order of charging priority and the order of discharging priority to which the charging priority ordering index ICm and the discharging priority ordering index IDm are reflected are given to the unspecific NaS batteries.

The specific NaS batteries may be the NaS batteries 1004 that are selected in advance, but if the NaS batteries 1004 where a failure occurs in cells are set as the specific NaS batteries, the NaS batteries 1004 where a failure occurs in the cells are deteriorated intensively, thereby facilitating the maintenance.

<5 Fifth Embodiment>

The fifth embodiment relates to determination of charging priority degree segments and discharging priority degree segments that is employed instead of the determination of the discharging priority degree segments and the charging priority degree segments according to the second embodiment.

FIG. 13 is a diagram describing the determination of the charging priority degree segments and the discharging priority degree segments according to the fifth embodiment. FIG. 13 illustrates the charging priority degree segments and the discharging priority degree segments of the specific m-numbered NaS batteries and the unspecific n-numbered NaS batteries.

As shown in FIG. 13, at the time of the determination of the charging priority degree segments and the discharging priority degree segments according to the fifth embodiment, the discharging priority degree segment and the charging priority degree segment to which the specific NaS batteries belong are determined as the first highest discharging priority degree segment and charging priority degree segment. As a result, since the charging power and discharging power are preferentially given to the specific NaS batteries, the specific NaS batteries 1004 are deteriorated intensively, thereby facilitating the maintenance.

The intra-segment orders of charging priority and the intra-segment orders of discharging priority given to the specific NaS batteries may be fixed, but the intra-segment ordering index Km may be reflected thereto, or they may be replaced cyclically when time passes.

The discharging priority degree segments and the charging priority degree segments to which the unspecific NaS batteries belong are determined by reflecting the segment determining index Jm thereto similarly to the second embodiment, and the intra-segment orders of charging priority and the intra-segment orders of discharging priority to which the intra-segment ordering index Km is reflected are given to the unspecific NaS batteries similarly to the second embodiment.

<6 Sixth Embodiment>

A sixth embodiment relates to ordering of intra-segment orders of charging priority and intra-segment orders of discharging priority that is employed instead of the ordering of the intra-segment orders of charging priority and the intra-segment orders of discharging priority according to the second embodiment.

FIG. 14 is a diagram describing the ordering of the intra-segment orders of charging priority and the intra-segment orders of discharging priority according to the sixth embodiment. FIG. 14 illustrates the intra-segment orders of charging priority and the intra-segment orders of discharging priority of the specific m-numbered NaS batteries and the unspecific n-numbered NaS batteries belonging to one charging priority degree segment and the discharging priority degree segment.

As shown in FIG. 14, at the time of the ordering of the intra-segment orders of charging priority and the intra-segment orders of discharging priority according to the sixth embodiment, the highest intra-segment order of charging priority and intra-segment order of discharging priority are given to the specific NaS batteries. That is, the first to mth intra-segment orders of charging priority and intra-segment orders of discharging priority are given to the specific NaS batteries, and the m+1st to m+nth intra-segment orders of charging priority and intra-segment orders of discharging priority are given to the unspecific NaS batteries. As a result, since the charging power and discharging power are preferentially allocated to the specific NaS batteries, the specific NaS batteries 1004 are deteriorated intensively, thereby facilitating the maintenance.

The intra-segment orders of charging priority and the intra-segment orders of discharging priority given to the specific NaS batteries may be fixed, or the intra-segment ordering index Km may be reflected thereto, and they, may be replaced cyclically when time passes.

Similarly to the second embodiment, the intra-segment orders of charging priority and the intra-segment orders of discharging priority to which the intra-segment ordering index Km is reflected are given to the unspecific NaS batteries.

<7 Seventh Embodiment>

A seventh embodiment relates to reflection of orders of charging priority to the allocation of the charging power and reflection of orders of discharging priority to the allocation of discharging power that are employed instead of the reflection of the orders of charging priority to the allocation of the charging power and reflection of the orders of discharging priority to the allocation of the discharging power according to the first embodiment.

Figure 15:
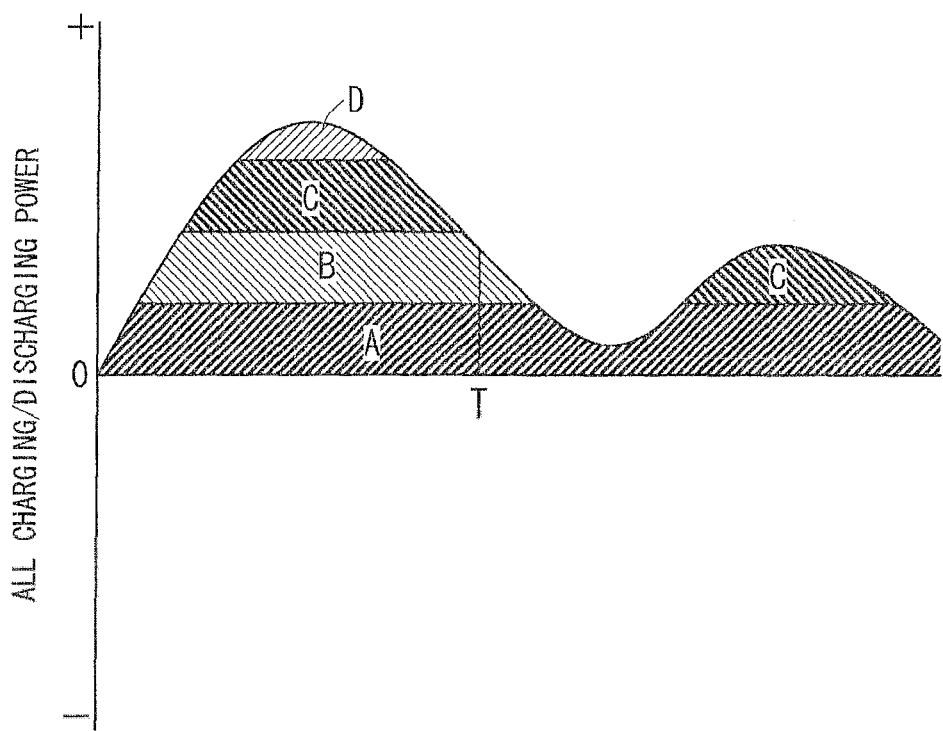
FIG. 15 is a graph describing reflection of the orders of charging priority to the allocation of the charging power according to a seventh embodiment.

FIG. 15 is a graph describing the reflection of the orders of charging priority to the allocation of the charging power according to the seventh embodiment. In the graph of FIG. 15, time is plotted along an abscissa axis, and all charging/discharging power is plotted along an ordinate axis. Positive all charging/discharging power represents charging power, and negative charging/discharging power represents discharging power. In the graph of FIG. 15, the charging power allocated to the NaS batteries A, B, C and D is shown by specific hatchings, respectively.

At timing T, when a state that the orders of charging priority of the NaS batteries A, B, C and D become lower in this order is changed into a state that the orders of charging priority of the NaS batteries A, C, B and D become lower in this order, due to replacement of the orders of charging priority of the NaS batteries B and C, an allocating destination of the charging power should be changed from the NaS battery B into the NaS battery C. However, when the change in the orders of charging priority is reflected to the allocation of the charging power immediately, the charging power of the NaS batteries B and C abruptly changes. Therefore, as shown in FIG. 15, it is desirable to execute a delay process for reflecting changed orders of charging priority to the allocation of the charging power after the allocation of charging power to the NaS battery B runs down due to a decrease in all the charging power. As a result, the sudden allocation or cancellation of the allocation of the charging power is repressed, and all the charging power becomes stable.

As to also the reflection of the orders of discharging priority to the allocation of the discharging power, the similar delay process is desirably executed. As to also the reflection of the charging priority degree segments and the intra-segment orders of charging priority to the allocation of the charging power and the reflection of the discharging priority degree segments and the intra-segment orders of discharging priority to the allocation of discharging power according to the second embodiment, the similar delay process is desirably executed.

<8 Eighth Embodiment>

An eighth embodiment relates to reflection of the orders of charging priority to the allocation of the charging power and reflection of the orders of discharging priority to the allocation of the discharging power that are employed instead of the reflection of the orders of charging priority to the allocation of the charging power and the reflection of the orders of discharging priority to the allocation of the discharging power according to the first embodiment.

Figure 16:
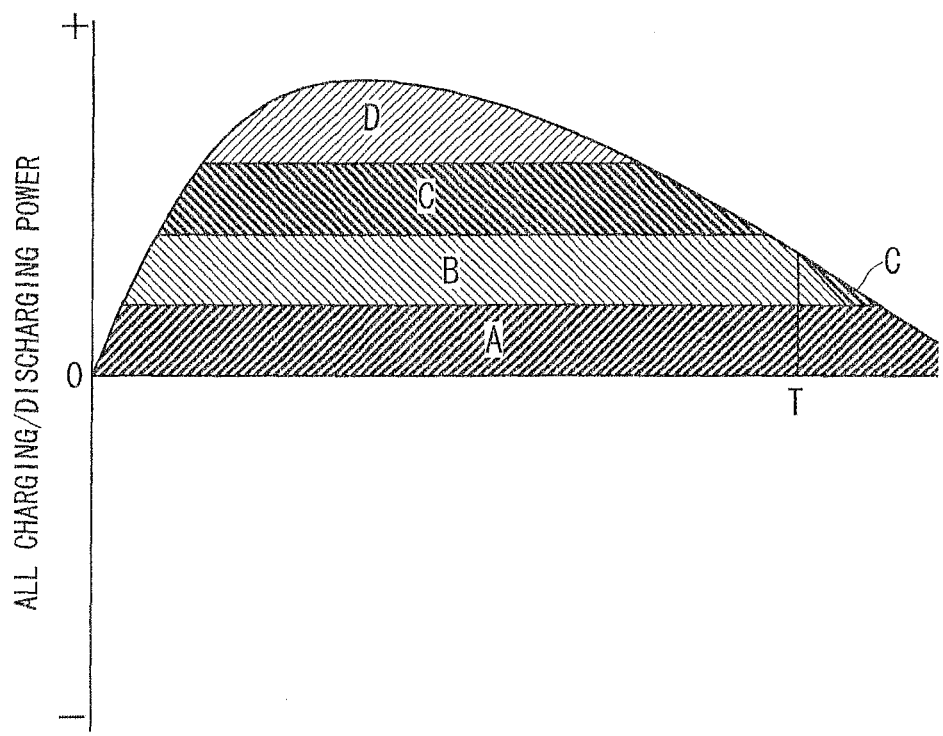
FIG. 16 is a graph describing reflection of the orders of charging priority to the allocation of the charging power according to an eighth embodiment.

FIG. 16 is a graph describing the reflection of the orders of charging priority to the allocation of the charging power according to the eighth embodiment. In the graph of FIG. 16, the time is plotted along an abscissa axis, and all the charging/discharging power is plotted along the ordinate axis. Positive all charging/discharging power represents the charging power, and negative charging/discharging power represents the discharging power. In the graph of FIG. 16, the charging power allocated to the NaS batteries A, B, C and D is shown by specific hatchings, respectively.

At timing T, the state that the orders of charging priority of the NaS batteries A, B, C and D become lower in this order is changed into the state that the orders of charging priority of the NaS batteries A, C, B and D become lower in this order, due to the replacement of the orders of charging priority of the NaS batteries B and C, the allocating destination of charging power should be changed from the NaS battery B into the NaS battery C. However, when the change in the orders of charging priority is reflected to the allocation of the charging power immediately, the charging power of the NaS batteries B and C abruptly changes. Therefore, as shown in FIG. 16, a delay process for changing the allocating destination of the charging power from the NaS battery B into the NaS battery C little by little is desirably executed. As a result, the abrupt allocation or cancellation of the allocation of the charging power is repressed, and all the charging power becomes stable.

As to also the reflection of the orders of discharging priority to the allocation of the discharging power, the similar delay process is desirably executed. As to also the reflection of the charging priority degree segments and the intra-segment orders of charging priority to the allocation of the charging power and the reflection of the discharging priority degree segments and the intra-segment orders of discharging priority to the allocation of the discharging power in the second embodiment, the similar delay process is desirably executed.

<9 Ninth Embodiment>

A ninth embodiment relates to charging priority degree segments and discharging priority degree segments that are employed instead of the charging priority degree segments and the discharging priority degree segments according to the second embodiment.

FIG. 17 is a diagram describing the charging priority degree segments according to the ninth embodiment.

Also in the ninth embodiment, the plurality of the charging priority degree segments is separated by the threshold of the segment determining index Jm. The threshold for lowering the charging priority degree segments is shifted towards the lower charging priority degree with respect to the threshold for raising the charging priority degree segments, and the threshold for lowering the discharging priority degree segments is shifted towards the lower discharging priority degrees with respect to the threshold for raising the discharging priority degree segments. As a result, inconveniences caused by the frequent changes in the charging priority degree segments and the discharging priority degree segments are repressed.

For example, when the three charging priority degree segments are present, as shown in FIG. 17, a threshold TH12U for raising the charging priority degree segments from the second to first is set to 21%, and a threshold TH12D for lowering the charging priority degree segments from first to second is set to 19%. Further, a threshold TH23U for lowering the charging priority degree segments from third to second is set to −19%, and a threshold for raising the charging priority degree segments from second to third is set to −21%.

<10 Tenth Embodiment>

A tenth embodiment relates to a power storage network 10002. The power storage network 10002 according to the tenth embodiment is provided with a controller for controlling charging/discharging of a plurality of charging/discharging units. The plurality of controllers composes a hierarchical controller network, a low-order controller posts an index or information necessary for determining the index, a maximum charging power and a maximum discharging power to a high-order controller, and the high-order controller posts allocation of charging power and discharging power to the low-order controller. "The charging/discharging unit" means a unit where charging/discharging is carried out independently, and occasionally means the power storage facility that has a controller, or occasionally means the NaS batteries that do not have the controller.

FIG. 18 is a block diagram illustrating the power storage network 10002 according to the tenth embodiment.

As shown in FIG. 18, the charging/discharging in the plurality of NaS batteries 10004 is controlled by a controller 10006, and the charging/discharging in the plurality of NaS batteries 10008 is controlled by a controller 10010. The plurality of NaS batteries 10004 and the controller 10006 compose a charging/discharging unit 10012, the plurality of NaS batteries 10008 and the controller 10010 also compose the charging/discharging unit 10014. Charging/discharging in the charging/discharging units 10012 and 10014, and in a NaS battery 10016 composing the charging/discharging unit in itself is controlled by a controller 10018. The charging/discharging units 10012 and 10014, the NaS battery 10016 and the controller 100018 compose a larger charging/discharging unit 10020.

Similarly, charging/discharging in a plurality of NaS batteries 10022 is controlled by a controller 10024. The plurality of NaS batteries 10022 and the controller 10024 compose a charging/discharging unit 10026. Charging/discharging in the charging/discharging unit 10026 and in a Nas battery 10028 composing a charging/discharging unit in itself are controlled by a controller 10030. The charging/discharging unit 10026, the NaS batteries 10028 and the controller 10030 compose a larger charging/discharging unit 10032.

Charging/discharging in the charging/discharging units 10020 and 10032 are controlled by a controller 10034.

The controllers 10006, 10010, 10018, 10024, 10030 and 10034 regard the charging/discharging units as the NaS batteries, and control the charging/discharging in the charging/discharging units similarly to the controller according to the first embodiment and a controller where the modifications described in the second embodiment to the tenth embodiment are added to the controller according to the first embodiment.

The number of the NaS batteries and the controllers in the power storage network 10002 is increased/decreased according to specifications of the power storage network 10002, and the number of hierarchies in the controller network is increased/decreased according to the specifications of the power storage network 10002.

FIG. 19 is a block diagram illustrating a low-order controller 10102 provided to a first charging/discharging unit whose charging/discharging is controlled by a high-order controller 10104 and the high-order controller 10104 for controlling the charging/discharging of a plurality of first charging/discharging units. In the power storage network 10002, for example, the controller 10006 is set to the low-order controller 10102, and the controller 10018 is set to the high-order controller 10104, and the charging/discharging units 10012 and 10014, and the NaS battery 10016 are set to the first charging/discharging unit.

As shown in FIG. 19, the high-order controller, 10104 has a communication part 10106 for communicating with the low-order controller 10102, and a power allocation determiner 10108 for determining the allocation of the charging power and discharging power to the first charging/discharging units.

The communication part 10106 transmits the allocated charging power and discharging power to the low-order controller 10102, and receives the indexes reflected to the charging priority degrees and the discharging priority degrees, the information necessary for specifying the indexes, the maximum charging power and the maximum discharging power from the low-order controller 10102. "The information necessary for specifying the indexes" is, for example, factors included in the indexes.

The power allocation determiner 10108 regards the first charging/discharging units as the NaS batteries, reflects the indexes received from the communication part 10106 or the indexes specified based on the information necessary for specifying the indexes so as to determine the charging priority degrees and the discharging priority degrees of the first charging/discharging units, allocates the charging power to the first charging/discharging units in descending manner of the charging priority degree, and allocates the discharging power to the charging/discharging units in descending manner of the discharging priority degrees.

The low-order controller 10102 has a communication part 10110 for communicating with the high-order controller 10104, and a power allocation determiner 10112 for determining allocation of the charging power and discharging power to second charging/discharging units whose charging/discharging is controlled by the low-order controller 10102.

The communication part 10110 receives the allocated charging power and discharging power from the high-order controller 10104, and transmits indexes or information necessary for specifying the indexes, a maximum charging power and a maximum discharging power to the high-order controller 10104. The maximum charging power transmitted by the communication part 10110 is a total of the maximum charging power in each of a plurality of second charging/discharging units, and the maximum discharging power transmitted by the communication part 10110 is a total of the maximum discharging power in each of the plurality of second charging/discharging units.

The power allocating determiner 10112 divides allocated charging power and discharging power that are received by a communication part, 10102, and allocates them to the second charging/discharging units.

In such a manner, the plurality of controllers are provided, information is exchanged between the high-order controller 10104 and the low-order controller 10102, and thus processes executed by one controller reduce, thereby facilitating the control of the charging/discharging in the many NaS batteries.

<11 Eleventh Embodiment>

An eleventh embodiment relates to a microgrid 11004 including the power storage facility 11002.

Figure 20:
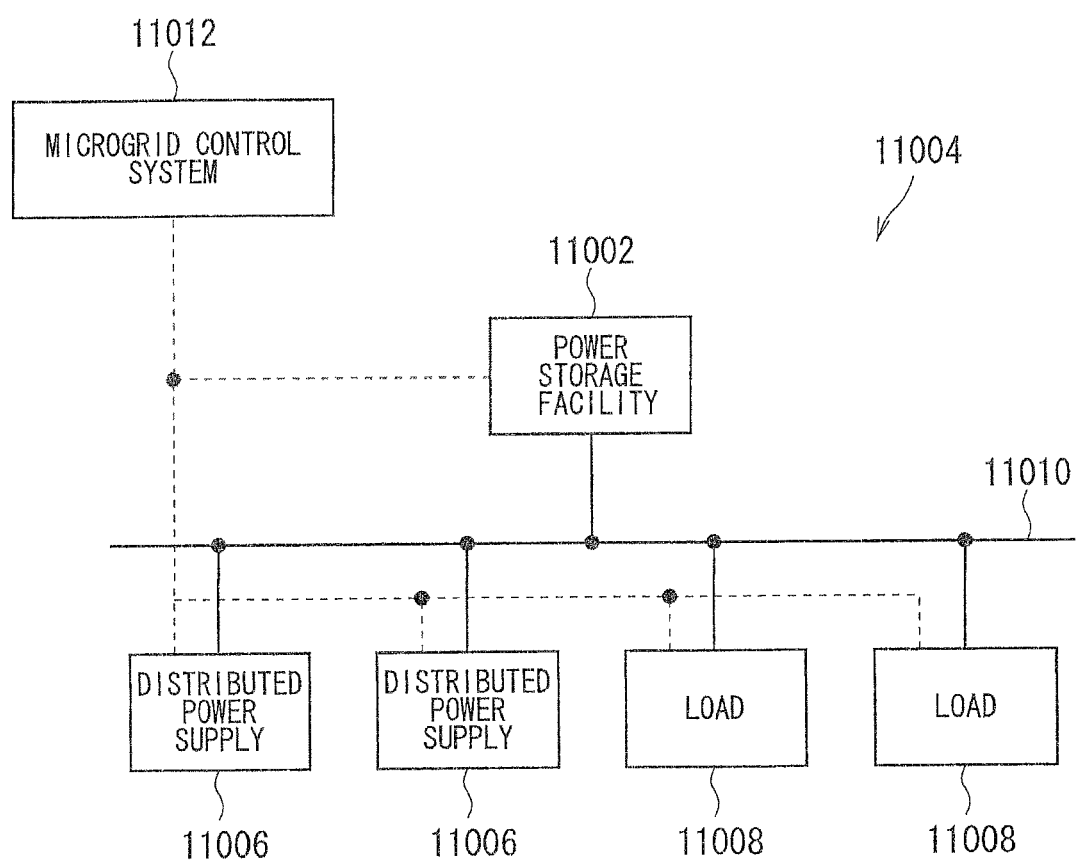
FIG. 20 is a block diagram illustrating a microgrid according to an eleventh embodiment.

FIG. 20 is a block diagram illustrating the microgrid 11004 according to the eleventh embodiment. "The microgrid" is a small-scale power supply network where a distributed power supply is installed in a power demand place, and called also "a distributed energy system" or the like.

As shown in FIG. 20, in the microgrid 11004, a distributed power supply 11006, a load 11008 and the power storage facility 11002 are connected, to a system 11010. Operations of the distributed power supply 11006, the load 11008 and the power storage facility 11002 are controlled by a microgrid control system 11012.

The distributed power supply 11006 is not particularly limited, but a generator utilizing solar light and the other natural energies, such as a solar photovoltaic device is used. A fuel cell or the like that uses gases as fuel manufactured by using garbage, waste wood, waste plastic and the like as raw materials may be used as the distributed power supply 11006.

All or some of the power generated by the distributed power supply 11006 are transmitted to the power storage facility 11002 via the system 11010, and are accumulated in the power storage facility 11002.

As the power storage facility, the power storage facility 1002 according to the first embodiment and power storage facilities that are obtained by adding the modifications described in the second embodiment through the ninth embodiment to the power storage facility 1002 according to the first embodiment are adopted.

<12 Other>

The present invention was described in detail, but the above description is the example from all aspects, and thus the present invention is not limited to the above description. Numberless modified examples, not illustrated, are assumed without departing from the scope of the present invention. Particularly, the described items are deservingly scheduled to be combined.

The invention claimed is:

1. A controller for controlling charging/discharging of a plurality of secondary batteries, comprising:
a charging/discharging current measuring part for measuring a charging/discharging current of each of the plurality of secondary batteries;
a bidirectional converter for controlling charging/discharging of each of the plurality of secondary batteries so that charging/discharging power takes a command;
a discharging capacity calculator for integrating a measured value of the charging/discharging current measured by said charging/discharging current measuring part and calculating a discharging capacity of each of the plurality of secondary batteries;
a charging state calculator for calculating a state of charge of each of the plurality of secondary batteries based on the calculated value of the discharging capacity calculated by said discharging capacity calculator;
a priority degree determiner for reflecting a first index so as to determine a charging priority degree and a discharging priority degree of each of the plurality of secondary batteries;
a power allocating part for allocating charging power to the secondary batteries in descending manner of the charging priority degree determined by said priority degree determiner and allocating discharging power to the secondary batteries in descending manner of the discharging priority degree determined by said priority degree determiner; and
a charging/discharging command part for commanding said bidirectional converter to charge/discharge the charging/discharging power allocated by said power allocating part, wherein
the first index includes a difference of a target value of the state of charge from the calculated value of the state of charge calculated by said charging state calculator as a factor, and
said priority degree determiner raises the charging priority degree and lowers the discharging priority degree with the increasing difference of the target value of the state of charge from the calculated value of the state of charge calculated by said charging state calculator.

2. The controller according to claim 1, further comprising:
a temperature sensor for measuring a temperature of each of the plurality of secondary batteries, wherein
the plurality of secondary batteries are secondary batteries that cause an exothermic reaction when being discharged,
the first index includes a measured value of the temperature measured by said temperature sensor as a factor, and
said priority degree determiner lowers the discharging priority degree as the increasing measured value of the temperature measured by said temperature sensor.

3. The controller according to claim 1, further comprising:
a temperature sensor for measuring a temperature of each of the plurality of secondary batteries, wherein
the plurality of secondary batteries are secondary batteries that cause an exothermic reaction when being charged,
the first index includes a measured value of the temperature measured by said temperature sensor as a factor, and
said priority degree determiner lowers the charging priority degree with the increasing measured value of the temperature measured by said temperature sensor.

4. The controller according to claim 1, wherein
said power allocating part allocates discharging power that is a first upper limit or less to each of the plurality of secondary batteries, said controller further comprises:
a temperature sensor for measuring a temperature in each of the plurality of secondary batteries; and
an upper limit calculator for calculating a second upper limit of the discharging power for maintaining the temperature at an upper limit temperature or less based on the measured value of the temperature measured by said temperature sensor and the calculated value of the discharging capacity calculated by said discharging capacity calculator in each of the plurality of secondary batteries,
the first index includes a ratio of the second upper limit calculated by said upper limit calculator to the first upper limit as a factor, and
said priority degree determiner raises the discharging priority degree with the increasing ratio of the second upper limit calculated by said upper limit calculator to the first upper limit.

5. The controller according to claim 1, further comprising:
a necessity determiner for determining necessity of correction of the calculated value of the discharging capacity at a charging end in each of the plurality of secondary batteries, wherein
the first index includes a determined result of said necessity determiner as a factor, and
when said necessity determiner determines that the calculated value of the discharging capacity needs to be corrected at the charging end, said priority degree determiner raises the charging priority degree and lowers the discharging priority degree.

6. The controller according to claim 1, further comprising:
a necessity determiner for determining necessity of correction of the calculated value of the discharging capacity at a discharging end in each of the plurality of secondary batteries, wherein
the first index includes a determined result of said necessity determiner as a factor, and
when said necessity determiner determines that the calculated value of the discharging capacity needs to be corrected at the discharging end, said priority degree determiner lowers the charging priority degree and raises the discharging priority degree.

7. The controller according to claim 1, further comprising:
a charging end detector for detecting arrival at the charging end at which the calculated value of the discharging capacity is corrected in each of the plurality of secondary batteries, wherein
the first index includes a detected result of said charging end detector as a factor, and
when said charging end detector detects the arrival at the charging end, said priority degree determiner lowers the charging priority degree and raises the discharging priority degree.

8. The controller according to claim 1, further comprising:
a discharging end detector for detecting arrival at the discharging end at which the calculated value of the discharging capacity is corrected in each of the plurality of secondary batteries, wherein
the first index further includes a detected result of said discharging end detector as a factor, and
when said discharging end detector detects the arrival at the discharging end, said priority degree determiner raises the charging priority degree and lowers the discharging priority degree.

9. The controller according to claim 1, further comprising:
a usage reflecting amount calculator for calculating a reflecting amount of usage of each of the plurality of secondary batteries, wherein
the first index includes the reflecting amount of the usage calculated by said usage reflecting amount calculator as a factor, and
said priority degree determiner raises the charging priority degree and the discharging priority degree with the decreasing usage.

10. The controller according to claim 1, wherein
said priority degree determiner includes a ordering part for reflecting the first index so as to ordering order of charging priority and order of discharging priority to each of the plurality of secondary batteries, and
said power allocating part allocates charging power to the secondary batteries in descending manner of the order of charging priority given by said ordering part and allocates discharging power to the secondary batteries in descending manner of the order of discharging priority given by said ordering part.

11. The controller according to claim 1, wherein
said priority degree determiner includes a segment determiner for carrying out stratification on the plurality of secondary batteries and determining a charging priority degree segment and a discharging priority degree segment to which each of the plurality of secondary batteries belongs based on the first index, said controller further comprises:
an intra-segment ordering part for reflecting a second index different from the first index so as to give intra-segment order of charging priority to each of the secondary batteries in each charging priority degree segment and give intra-segment order of discharging priority to each of the secondary batteries in each discharging priority degree segment, and
said power allocating part allocates charging power to the secondary batteries in descending manner of the belonging charging priority degree segment determined by said segment determiner, allocates discharging power to the secondary batteries in descending manner of the belonging discharging priority degree segment determined by said segment determiner, allocates charging power to the secondary batteries belonging to the same charging priority degree segment in descending manner of the intra-segment order of charging priority determined by said intra-segment ordering part, and allocates discharging power to the secondary batteries in the same belonging discharging priority degree segment in descending manner of the intra-segment order of discharging priority determined by said intra-segment ordering part.

12. The controller according to claim 11, further comprising:
a temperature sensor for measuring a temperature of each of the plurality of secondary batteries, wherein
the plurality of secondary batteries are secondary batteries that cause an exothermic reaction when being discharged,
the second index includes a measured value of the temperature measured by said temperature sensor as a factor, and
said intra-segment ordering part lowers the intra-segment order of discharging priority with the increasing measured value of the temperature measured by said temperature sensor.

13. The controller according to claim 11, further comprising:
a temperature sensor for measuring a temperature of each of the plurality of secondary batteries, wherein
the plurality of secondary batteries are secondary batteries that cause an exothermic reaction when being charged,
the second index includes a measured value of the temperature measure by said temperature sensor as a factor, and
said intra-segment ordering part lowers the intra-segment order of charging priority with the increasing measured value of the temperature measured by said temperature sensor.

14. The controller according to claim 11, further comprising:
a necessity determiner for determining necessity of correction of a calculated value of a discharging capacity at the charging end in each of the plurality of secondary batteries, wherein
the second index includes a determined result of said necessity determiner as a factor, and
when said necessity determiner determines that the calculated value of the discharging capacity needs to be corrected at the charging end, said intra-segment ordering part raises the intra-segment order of charging priority and lowers the intra-segment order of discharging priority.

15. The controller according to claim 11, further comprising:
a necessity determiner for determining necessity of correction of the calculated value of the discharging capacity at the discharging end in each of the plurality of secondary batteries, wherein
the second index includes a determined result of said necessity determiner as a factor, and
when said necessity determiner determines that the calculated value of the discharging capacity needs to be corrected at the discharging end, said intra-segment ordering part lowers the intra-segment order of charging priority and raises the intra-segment order of discharging priority.

16. The controller according to claim 11, further comprising:
a charging end detector for detecting arrival at the charging end at which the calculated value of the discharging capacity is corrected in each of the plurality of secondary batteries, wherein
the second index includes a detected result of said charging end detector as a factor, and
when said charging end detector detects the arrival at the charging end, said intra-segment ordering part lowers the intra-segment order of charging priority and raises the intra-segment order of discharging priority.

17. The controller according to claim 11, further comprising:
a discharging end detector for detecting arrival at the discharging end at which the calculated value of the discharging capacity is corrected in each of the plurality of secondary batteries, wherein
the second index includes a detected result of said charging end detector as a factor, and
when said discharging end detector detects the arrival at the discharging end, said intra-segment ordering part raises the intra-segment order of charging priority and lowers the intra-segment order of discharging priority.

18. The controller according to claim 11, further comprising:
a usage reflecting amount calculator for calculating a reflecting amount of usage of each of the plurality of secondary batteries, wherein
the second index includes the reflecting amount of the usage calculated by said usage reflecting amount calculator as a factor, and
said intra-segment ordering part raises the intra-segment order of charging priority and the intra-segment order of discharging priority with the decreasing usage.

19. The controller according to claim 11, wherein the intra-segment ordering part gives highest intra-segment order of charging priority and highest intra-segment order of discharging priority to a specific secondary battery in the plurality of secondary batteries.

20. The controller according to claim 1, wherein
said priority degree determiner has a segment determiner for carrying out stratification on the plurality of secondary batteries and determining charging priority degree segment and discharging priority degree segment to which each of the plurality of secondary batteries belongs based on the first index, said controller further comprises:
an intra-segment ordering part for giving order of charging priority to each secondary battery in each charging priority degree segment and cyclically reshuffling the order of charging priority after time passes and giving order of discharging priority to each secondary battery in each discharging priority degree segment and cyclically reshuffling the order of discharging priority after time passes, and
said power allocating part allocates charging power to the secondary batteries in descending manner of the belonging charging priority degree segment determined by said segment determiner, allocates discharging power to the secondary batteries in descending manner of the belonging discharging priority degree segment determined by said segment determiner, allocates the charging power to the secondary batteries belonging to the same charging priority degree segment in descending manner of the intra-segment order of charging priority given by said intra-segment ordering part, and allocates the discharging power to the secondary batteries belonging to the same discharging priority degree segment in descending manner of the intra-segment order of discharging priority given by said intra-segment ordering part.

21. The controller according to claim 11, wherein a threshold of the first index in case said segment determiner lowers the charging priority degree segment is shifted to a direction of lower charging priority degree than a threshold of the first index in case the segment determiner raises the charging priority degree segment.

22. The controller according to claim 1, wherein when a change in an allocating destination of the charging power from a first secondary battery into a second secondary battery is necessary due to a change in the charging priority degree determined by said priority degree determiner, said power allocating part reflects the change in the charging priority degree to the allocation of the charging power after the allocation of the charging power to the first secondary battery does not remain due to a decrease in all the charging power, and when a change in an allocating destination of the discharging power from the first secondary battery into the second secondary battery is necessary due to a change in the discharging priority degree determined by said priority degree determiner, said power allocating part reflects the change in the discharging priority degree to the allocation of the discharging power after allocation of the discharging power to the first secondary battery does not remain due to a decrease in all the discharging power.

23. The controller according to claim 1, wherein
when the change in the allocating destination of the charging power from the first secondary battery into the second secondary battery is necessary due to the change in the charging priority degree determined by said priority degree determiner, said power allocating part gradually changes the allocating destination of the charging power from the first secondary battery into the second secondary battery, and when the change in the allocating destination of the discharging power from the first secondary battery into the second secondary battery is necessary due to the change in the discharging priority degree determined by the priority degree determiner, said power allocating part gradually changes the allocating destination of the discharging power from the first secondary battery into the second secondary battery.

24. The controller according to any one of claim 1, wherein said priority degree determiner raises the charging priority degree and the discharging priority degree of a specific secondary battery in the plurality of secondary batteries the most.

25. The controller according to claim 1, wherein said charging/discharging command part stops operations of all or some of said bidirectional converters for controlling the charging/discharging of the secondary batteries to which the charging power or the discharging power is not allocated by said power allocating part.

26. The controller according to claim 25, wherein said charging/discharging command part stops the operations of said bidirectional converts other than said bidirectional converter for controlling the charging/discharging of the secondary battery having the highest charging priority degree or the highest discharging priority degree in the secondary batteries to which the charging power or the discharging power is not allocated by said power allocating part.

27. The controller according to claim 25, wherein said charging/discharging command part stops the operation of said bidirectional convert for controlling the charging/discharging of the secondary battery having the highest charging priority degree or the highest discharging priority degree in the secondary batteries to which the charging power or the discharging power is not allocated by said power allocating part and restarts the operation before the charging power or the discharging power is newly allocated.

28. A controller network having a plurality of controllers for controlling charging/discharging in a plurality of charging/discharging units, comprising:
   a high-order controller for controlling charging/discharging in a plurality of first charging/discharging units; and
   a low-order controller, that is provided to all or some of the first charging/discharging units, for controlling charging/discharging in a second charging/discharging unit, wherein
   said high-order controller includes;
      a first communication part for communicating with said low-order controller, transmitting the allocated charging power and discharging power to said low-order controller and receiving an index reflected to the charging priority degree and the discharging priority degree or information necessary for specifying the index from said low-order controller, and
      a power allocation determiner for reflecting the index received from said first communication part or an index specified based on the information necessary for specifying the index so as to determine the charging priority degree and the discharging priority degree in the first charging/discharging unit, allocating the charging power to the first charging/discharging units in descending manner of the charging priority degree, and allocating the discharging power to the first charging/discharging unit in descending manner of the discharging priority degree,
   said low-order controller includes a second communication part for communicating with said high-order controller, receiving the allocated charging power and discharging power from said high-order controller, and transmitting the index or information necessary for specifying the index to said high-order controller,
   the index includes a difference of a target value of the state of charge from a calculated value of state of charge as a factor, and
   said power allocating part raises the charging priority degree and lowers the discharging priority degree with the increasing difference of the target value of the state of charge from the calculated value of the state of charge.

29. A control method for controlling charging/discharging in a plurality of secondary batteries, comprising the steps of:
   (a) measuring a charging/discharging current in each of the plurality of secondary batteries,
   (b) integrating a measured value of the charging/discharging current measured at said step (a) and calculating discharging capacity in each of the plurality of secondary batteries,
   (c) calculating a state of charge in each of the plurality of secondary batteries based on the calculated value of the discharging capacity calculated at said step (b),
   (d) reflecting a first index so as to determine the charging priority degree and the discharging priority degree of each of the plurality of secondary batteries,
   (e) allocating charging power to the secondary batteries in descending manner of the charging priority degree determined at said step (d), and allocating discharging power to the secondary batteries in descending manner of the discharging priority degree determined at said step (d),
   (f) commanding charging/discharging of the charging/discharging power allocated at said step (e), and
   (g) controlling the charging/discharging of each of the plurality of secondary batteries so that the charging/discharging power becomes a commanded value commanded at said step (f), wherein the first index includes a difference of a target value of the state of charge from the calculated value of the state of charge calculated at said step (c) as a factor, and at said step (d), the charging priority degree is raised and the discharging priority degree is lowered with the increasing difference between the calculated value of the state of charge calculated at said step (c) and the target value of the state of charge.

\* \* \* \* \*